United States Patent
Wang et al.

(10) Patent No.: US 12,354,241 B1
(45) Date of Patent: Jul. 8, 2025

(54) DIFFUSION-BASED MULTIPLE-MODALITY IMAGE FUSION

(71) Applicant: Hong Kong Applied Science and Technology Research Institute Company Limited, Hong Kong (HK)

(72) Inventors: Zhihan Wang, Hong Kong (HK); Yan Huo, Shenzhen (CN)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 18/603,206

(22) Filed: Mar. 13, 2024

(51) Int. Cl.
*G06T 5/50* (2006.01)
*G06T 3/4053* (2024.01)
(Continued)

(52) U.S. Cl.
CPC .............. *G06T 5/50* (2013.01); *G06T 3/4053* (2013.01); *G06T 5/70* (2024.01); *G06V 10/42* (2022.01);
(Continued)

(58) Field of Classification Search
CPC ........... G06T 5/50; G06T 3/4053; G06T 5/70; G06T 2207/10024; G06T 2207/10048;
(Continued)

(56) References Cited

U.S. PATENT DOCUMENTS 11,842,460 B1 * 12/2023 Chen .......................... G06T 5/60
2019/0096038 A1 * 3/2019 El-Khamy ................ G06T 5/60
(Continued)

FOREIGN PATENT DOCUMENTS

CN 112862684 A * 5/2021
CN 113222839 A 8/2021
(Continued)

OTHER PUBLICATIONS

Ilesanmi, A. E., & Ilesanmi, T. O. (2021). Methods for image denoising using convolutional neural network: a review. Complex & Intelligent Systems, 7(5), 2179-2198.*
(Continued)

*Primary Examiner* — Sarah Lhymn
(74) *Attorney, Agent, or Firm* — Stuart T. Auvinen; g Patent LLC

(57) ABSTRACT

An image-guided diffusion network has two Convolution Neural Networks (CNNs). A RGB image and an IR image are concatenated with a Gaussian noise image and input to a denoising neural network that merges information from the RGB and IR images as noise is removed over many iterations. Then an enhancement neural network up-samples for Super Resolution (SR) and convolutes to generate a condition vector that controls Global Feature Modulation (GFM) at three convolution layers to generate a SRGFM enhanced fusion image. Timesteps are embedded using adaptive group normalization blocks within Adaptive Bottleneck Residual (ABR) blocks in the denoising network, which is a UNet having many levels of ABRs, and in the enhancement network before feature modulation. Global image features are detected by triple convoluting the image input to the enhancement network to generate the condition vector that controls feature modulation blocks at three layers of convolution.

20 Claims, 19 Drawing Sheets

(51) Int. Cl.
  *G06T 5/70* (2024.01)
  *G06V 10/42* (2022.01)
  *G06V 10/771* (2022.01)
  *G06V 10/80* (2022.01)

(52) U.S. Cl.
  CPC .......... *G06V 10/771* (2022.01); *G06V 10/806* (2022.01); *G06T 2207/10024* (2013.01); *G06T 2207/10048* (2013.01); *G06T 2207/20084* (2013.01); *G06T 2207/20221* (2013.01)

(58) Field of Classification Search
  CPC .......... G06T 2207/20084; G06T 2207/20221; G06V 10/42; G06V 10/771; G06V 10/806
  See application file for complete search history.

(56) References Cited

U.S. PATENT DOCUMENTS

| | | | | |
|---|---|---|---|---|
| 2022/0020123 | A1* | 1/2022 | Xing | G06T 5/70 |
| 2022/0107378 | A1* | 4/2022 | Dey | G01R 33/56 |

FOREIGN PATENT DOCUMENTS

| | | |
|---|---|---|
| CN | 116258658 B | 7/2023 |
| CN | 111833282 B | 8/2023 |
| CN | 116703747 A | 9/2023 |
| CN | 116980541 A | 10/2023 |
| CN | 117058009 A | 11/2023 |
| CN | 117094924 A | 11/2023 |
| CN | 117455809 A | 1/2024 |
| CN | 117636130 A | 3/2024 |

OTHER PUBLICATIONS

Gurrola-Ramos, J., Dalmau, O., & Alarcón, T. E. (2021). A residual dense u-net neural network for image denoising. IEEE Access, 9, 31742-31754.*

Zhao T, Yuan M, Jiang F, Wang N, Wei X. Removal and selection: Improving RGB-infrared object detection via coarse-to-fine fusion. arXiv preprint arXiv:2401.10731. Jan. 19, 2024.*

Soroush, R., & Baleghi, Y. (2023). NIR/RGB image fusion for scene classification using deep neural networks. The visual computer, 39(7), 2725-2739.*

Yanting Hu, et al. "Channel-Wise and Spatial Feature Modulation Network for Single Image Super-Resolution", IEEE Transactions on Circuits and Systems for Video Technology (vol. 30 Issue: 11, p. 3911-3927), May 7, 2019.

Zixiang Zhao, et al. "DDFM: Denoising Diffusion Model for Multi-Modality Image Fusion", (ICCV 2023 proceedings), Mar. 13, 2023.

Jinyuan Liu at al. "Target-aware Dual Adversarial Learning and a Multi-scenario Multi-Modality Benchmark to Fuse Infrared and Visible for Object Detection", IEEE/CVF Conference on Computer Vision and Pattern Recognition (CVPR), 2022. (Oral), https://github.com/JinyuanLiu CV/TarDAL, TarDAL GitHub Web Page printed Feb. 9, 2024.

Hui Li and Xiao-Jun Wu, "DenseFuse: A Fusion Approach to Infrared and Visible Images", Accepted by IEEE Transactions on Image Processing, Jan. 20, 2019.

ISR and Written Opinion, PCT/CN2024/083101, Dec. 6, 2024.

Yue, Jun et al. "Dif-Fusion: Towards High Color Fidelity in Infrared and Visible Image Fusion with Diffusion Models", arXiv:2301.08072v1, pp. 1-13, Jan. 19, 2023.

* cited by examiner

FIG. 2A RGB INPUT
FIG. 2B IR INPUT
FIG. 2C DENSE FUSE (ADDITION)
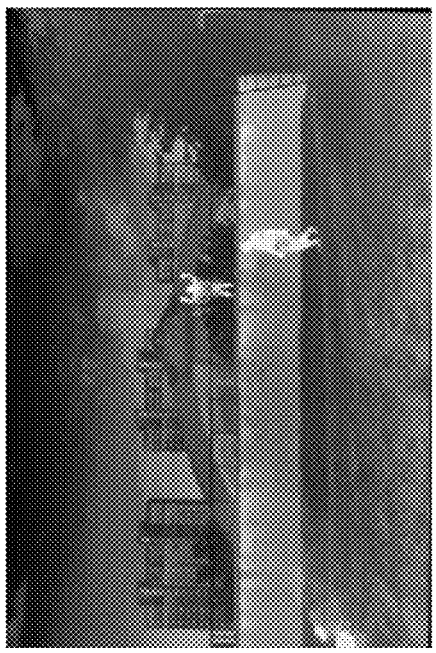
FIG. 2D DENSE FUSE (L1)
PRIOR ART

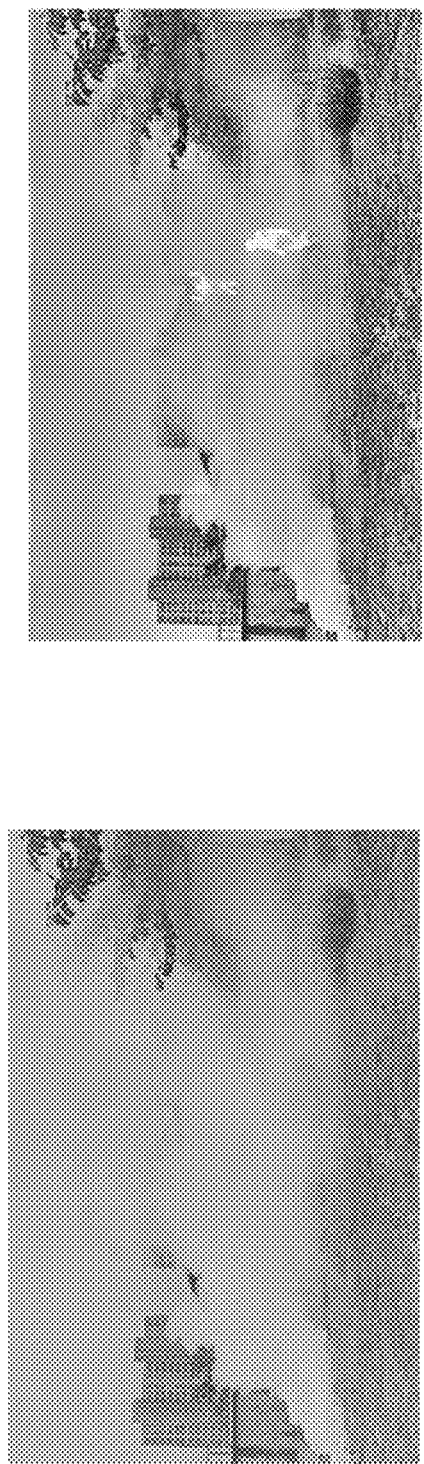
FIG. 3A RGB INPUT
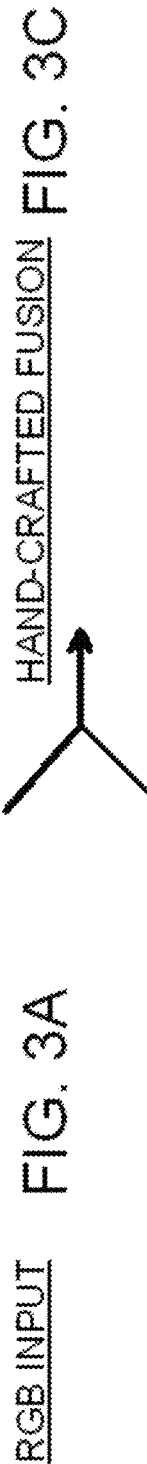
FIG. 3C HAND-CRAFTED FUSION
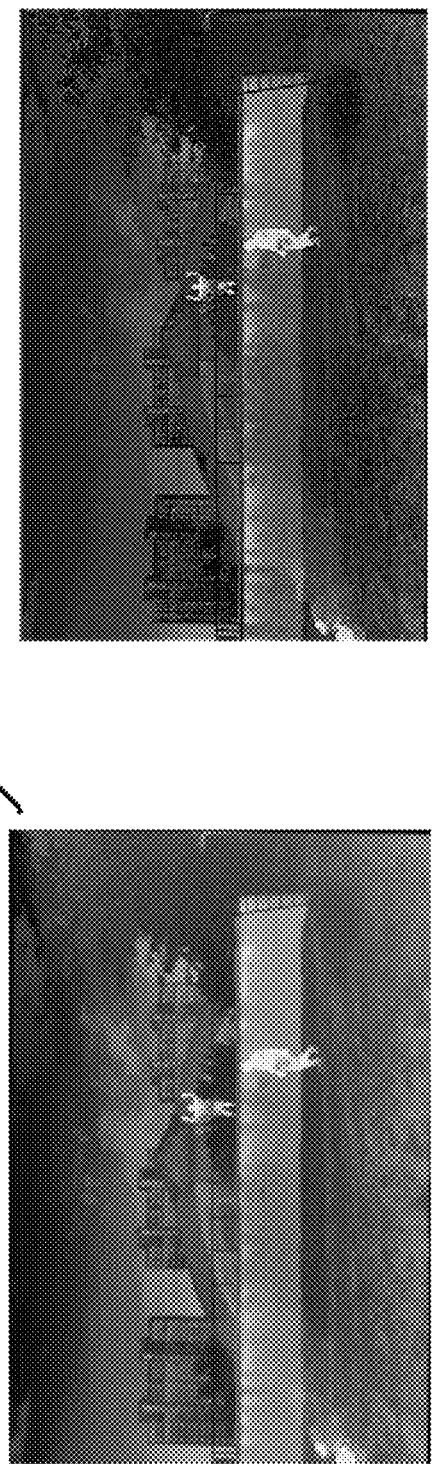
FIG. 3B IR INPUT
FIG. 3D TARDAL
PRIOR ART

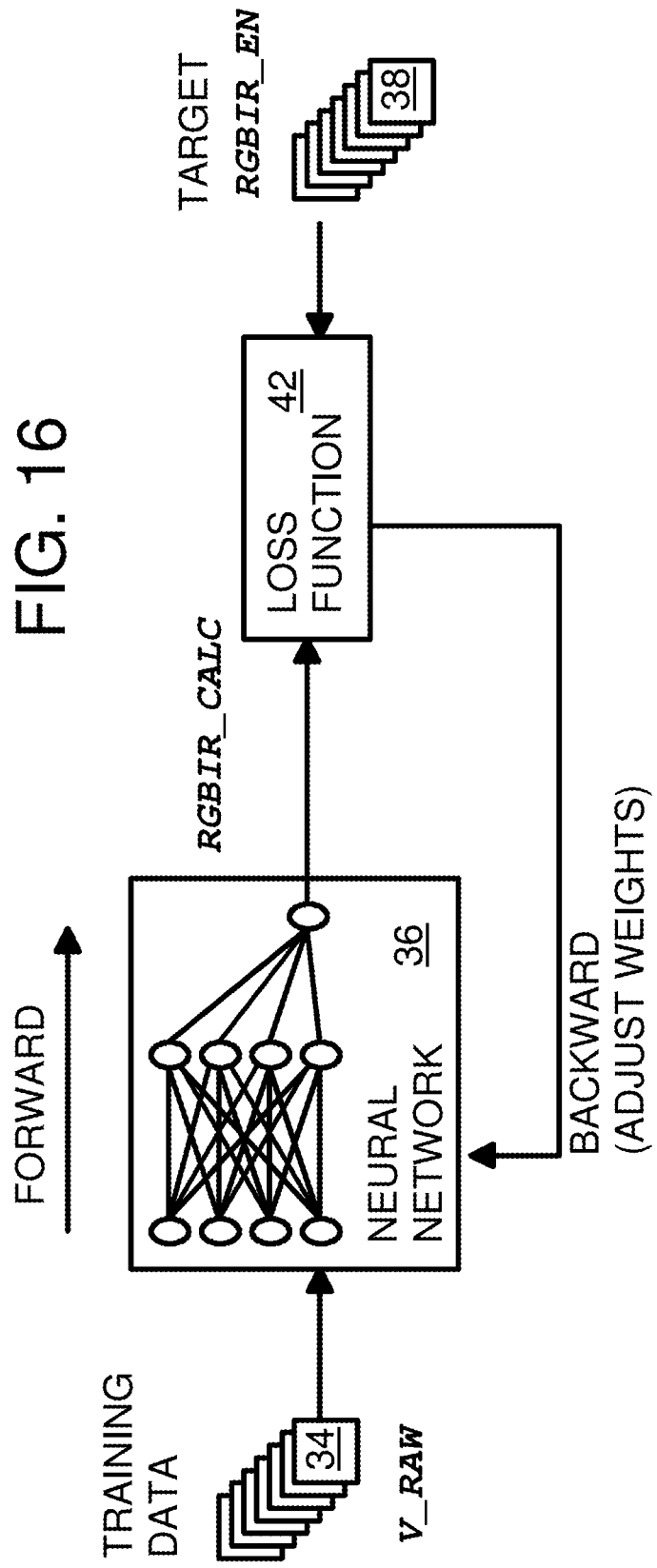

DIFFUSION-BASED MULTIPLE-MODALITY IMAGE FUSION

FIELD OF THE INVENTION

This invention relates to neural networks, and more particularly to image fusion using neural networks.

BACKGROUND OF THE INVENTION

Image processing is widely used for tasks such as image enhancement, image blending, facial recognition, Optical Character Recognition (OCR) such as to read license plates on moving cars, and object tracking for autonomous vehicle collision avoidance. Image data is often processed using Neural Networks.

Artificial Neural Networks are especially useful for processing large amounts of data in complex ways that are hard to define using traditional computer programs. Instead of being programmed with instructions, training data is input to a neural network and compared to the expected output, then adjustments are made within the neural network and the training data is again processed and outputs compared to generate further adjustments to the neural network. After many such training cycles, the neural network is altered to efficiently process data similar to the training data and expected outputs. Neural networks are an example of machine learning, since the neural network learns how to generate the expected outputs for the training data. Real data similar to the training data can then be input to the neural network to process live data.

FIG. 1 illustrates a prior art neural network. Input nodes 802, 804, 806, 808 receive input data $I_1, I_2, I_3, \ldots I_4$, while output nodes 103, 105, 107, 109 output the result of the neural network's operations, output data $O_1, O_2, O_3, \ldots O_4$. Three layers of operations are performed within this neural network. Nodes 110, 112, 114, 116, 118, each take inputs from one or more of input nodes 802, 804, 806, 808, perform some operation, such as addition, subtraction, multiplication, or more complex operations, and send and output to nodes in the second layer. Second-layer nodes 120, 122, 124, 126, 128, 129 also receive multiple inputs, combine these inputs to generate an output, and send the outputs on to third-level nodes 132, 134, 136, 138, 139, which similarly combine inputs and generate outputs.

The inputs at each level are typically weighted, so weighted sums (or other weighted operation results) are generated at each node. These weights can be designated $W_{31}, W_{32}, W_{32}, W_{33}, \ldots W_{41}$, etc., and have their values adjusted during training. Through trial and error or other training routines, eventually higher weights can be given for paths that generate the expected outputs, while smaller weights assigned to paths that do not generate the expected outputs. The machine learns which paths generate the expected outputs and assigns high weights to inputs along these paths.

These weights can be stored in weights memory 100. Since many neural networks have many nodes, there may be many weights to store in weights memory 100. Each weight may require multiple binary bits to represent a range of possible values for that weight.

Deep neural networks have many layers of nodes and are often used for applications such as object classification, speech recognition, sentiment analysis, image recognition, facial detection, and other graphics processing. Images in a video sequence can be captured and processed by such a neural network.

Multiple modality image fusion combines images captured from different cameras, such as from a standard Red Green Blue (RGB) camera capturing visible light of different colors, and a camera capturing Infra-Red (IR) light or heat signals. While RGB cameras are good at capturing color, texture, and detail, they suffer in non-ident lighting conditions such as low-light conditions, glare from bright lights such as car headlights, particulates blockage such as from smoke or fog, and extreme dynamic range scenes, such as looking into a dark tunnel on a bright day.

IR cameras capture longer-wavelength IR, which can often penetrate particulates such as smoke or fog. IR cameras can detect heat from persons and vehicles that are otherwise dark in the visible spectrum. However, IR images are typically low-contrast and lack color and textual information of RGB images. Multiple modality image fusion merges RGB and IR images to provide an enhanced fusion image with details from both RGB and IR.

FIGS. 2A-2D show image fusion using a prior-art encoder-decoder based Convolution Neural Network (CNN). Encoder-decoder CNN-based image fusion methods such as Dense Fuse use the encoder-decoder architecture to fuse images at multiple scales. The same network is used to extract features from RGB and IR images. However, a software expert is needed to manually design the fusion layer weight combination method, such as addition or L1, and the resulting image quality may not be very good.

FIG. 2A shows an input RGB image having smoke obstruction. FIG. 2B shows an input IR image that can see through the smoke to reveal 2 persons and buildings behind the smoke. However, the contrast in the IR image is poor. FIG. 2C shows an image fusion output using the Dense Fuse (addition) method. The image is too bright, hiding one of the 2 persons in the smoke. FIG. 2D shows an image fusion output using the Dense Fuse (L1) method. The image is better, showing the 2 persons in the smoke.

Dense Fuse is sensitive to the weight combination of the RGB and IR images. This weight combination needs to be selected manually for best results. This manual selection of weight combination is undesirable, since a human must look at the images and choose the weight combination that produces the best results for the particular image inputs and scene. Fused image quality can be very dependent on the weightings selected by the human expert.

FIGS. 3A-3D show image fusion using other prior-art methods. FIG. 3A shown an input RGB image having smoke obstruction. FIG. 3B shows an input IR image that can see through the smoke to reveal 2 persons and buildings behind the smoke. However, the contrast in the JR image is poor.

FIG. 3C shows a hand-crafted image fusion output. A human expert selects from among traditional image-fusion methods to find a method that produces the best output. This hand-crafted approach can require a lot of time for the best image quality, as the more methods that are tested increases the likelihood of finding a method that produces good image results. However, the results will differ for different scenes and lighting conditions. The methods chosen for seeing through smoke are likely different than the methods chosen for seeing into a dark tunnel, or when glare from bright headlights interferes with vision.

FIG. 3D shows an image fusion output using the TarDAL method. The image is better, showing the 2 persons in the smoke. However, the visual quality is lower, as the exposure, color, and grass details are poor, and mode collapse can occur under extreme conditions. TarDAL is a Generative Adversarial Network (GAN) having a generator neural network that fuses images at multiple scales, and a discriminator neural network that controls the fused image quality. However, GAN models are relatively hard to train, and may suffer from mode collapse. The quality of the generation results may be unstable. The generator and discriminator need to be designed for specific applications.

Autonomous guided vehicles such as self-driving cars must have vision systems that do not rely upon human experts to select weightings and methods that best fit a particular scene, because the scenes are changing at up to 100 kph as the car is driving, so there is not enough time for human intervention. Unstable methods are undesirable for such applications since image glitches could cause the car to steer into the wrong path, or to hit objects that are unstably detected.

What is desired is a multiple modality image fusion method that does not rely upon human experts to select methods or weightings that best fit a particular scene or lighting conditions. A fusion method using neural networks to produce stable images is desirable. Stable and enhanced fusion images are desired for machine visualization and object recognition.

BRIEF SUMMARY OF THE INVENTION

An image-guided multiple-modality image fusion system has a computer or a machine with circuitry to implement a denoising neural network that receives a color image having pixels representing multiple colors, and that receives a non-visible-light image having mono-color pixels generated by a non-visible-light detector, and that receives a Gaussian noise image, the denoising neural network generating an intermediate image as an output.

The computer or the machine further also has circuitry to implement an enhancement neural network that receives the intermediate image from the denoising neural network and that generates a fusion output. The fusion output is fed back to an input of the denoising neural network. The denoising neural network has a series of contracting layers, each contracting layer reducing a number of pixels and increasing feature-map depth. The denoising neural network has a series of expansion layers, after the series of contracting layers. Each increases a number of pixels and decreases feature-map depth. Each contracting layer in the series of contracting layers has an Adaptive Bottleneck Residual (ABR) block and an ABR down-sampling block that is an instance of the ABR block with a down-sampler.

Each expansion layer in the series of expansion layers has the ABR block and an ABR up-sampling block that is an instance of the ABR block with an up-sampler. A first layer receives the color image, the non-visible-light image, and the Gaussian noise image, and receives the fusion output during non-initial iterations. The first layer drives an input to an initial contracting layer in the series of contracting layers. A last layer outputs the intermediate image from a final expansion layer in the series of expansion layers.

A timestep embedder in the ABR block is injected into each ABR block and into each ABR down-sampling block and into each ABR up-sampling block. Features from the non-visible-light image and from the color image are fused together to form the fusion output.

The enhancement neural network has multiple convolution layers that convolute the intermediate image to generate a condition vector that identifies global features in the intermediate image. A first layer convolutes the intermediate image to generate a first layer output. A second layer convolutes the first layer output to generate a second layer output. A third layer convolutes the second layer output to generate a third layer output that is the fusion output.

The first layer, the second layer, and the third layer each have a convolution layer, an adaptive group normalization block that normalizes an output from the convolution layer and that embeds a timestep to generate a feature map, and a feature modulation block that receives the condition vector and modulates global features identified by the condition vector that are present in the feature map to generate a layer output. The feature modulation block performs Global Feature Modulation (GFM) in response to the global features identified by the condition vector.

The enhancement neural network further has an up-sampler that up-samples the intermediate image before input to the first layer. The enhancement neural network performs Super Resolution image enhancement with Global Feature Modulation (SRGFM).

The first layer and the second layer further have an activation block that performs an activation function on the feature map to generate the layer output. The first layer output and the second layer output are activated before input to a next convolution layer.

The feature modulation block has a linear block that linearizes the condition vector, a chunking block that forms groups from the condition vector, a scaler that generates a scale factor from the groups from the condition vector, a bias generator that generates a bias from the groups from the condition vector, a multiplier that multiplies an input feature map by the scale factor to generate a scaled feature map, and an adder that adds the bias to the scaled feature map to generate an output feature map for the layer output.

The series of contracting layers and the series of expansion layers form a U-net convolution neural network. The denoising neural network is a U-net Convolution Neural Network (CNN).

An output from an ABR block in the series of contracting layers is concatenated with an output from an ABR block in the series of expanding layers for each layer.

The ABR block has a first layer receiving an input to the ABR block and having a convolution layer generating a first layer output to a next layer. The convolution layer in the first layer is a 1×1 bottleneck convolution layer. The ABR block also has one or more intermediate layers, each receiving a layer output from a prior layer and each having a convolution layer generating a layer output, a last layer receiving the layer output for a last layer of the one or more intermediate layers and having a convolution layer generating a last layer output, a bottleneck convolution layer receiving the input to the ABR block and generating a bottleneck convolution output, an ABR adder that adds the bottleneck convolution output to the last layer output to generate an output of the ABR block, and a normalizer in each layer for normalizing an input to the layer.

One or more normalizers in the last layer and in the one or more intermediate layers has an adaptive group normalization block. The adaptive group normalization block further has a linear block that linearizes the timestep, a chunking block that forms groups from the timestep, a scaler that generates a scale factor from the groups from the timestep, a bias generator that generates a bias from the groups from the timestep, a group normalizer that normalizes an input to the adaptive group normalization block to generate a normalized dataset, a multiplier that multiplies the normalized dataset by the scale factor to generate a scaled normalized dataset, and an adder that adds the bias to the scaled normalized dataset to generate an output of the adaptive group normalization block.

Each layer further has an activation block that performs an activation function on an output from the normalizer to generate an input to the convolution layer. Normalized outputs are activated before input to the convolution layer.

The first layer concatenates the color image, the non-visible-light image, and the Gaussian noise image to drive the input to the initial contracting layer in the series of contracting layers for an initial iteration.

The color image has pixels representing Red, Green, and Blue colors. Non-visible-light is Infra-Red (IR) light, wherein the non-visible-light image is an IR image having mono-color pixels generated by an IR camera.

A method for multiple-modality image fusion has steps that include receiving for each scene a RGB image and receiving an IR image having details that are not visible in the RGB image, combining the RGB image, the IR image, and a noise image to generate a combined input, iterating a denoising neural network that receives the combined input and generates an intermediate image having reduced noise as a number of iterations increases. The denoising neural network using the RGB image and the IR image as guidance images for each iteration to reduce noise in subsequent iterations. The denoising neural network is a UNet Convolution Neural Network (CNN) formed from Adaptive Bottleneck Residual (ABR) blocks at each level. Each ABR block has a convolution layer generating a convolution output that is normalized to generate a normalized output. Each ABR block receives a timestep that is embedded by scaling and biasing the normalized output in response to the timestep.

Steps also include iterating an enhancement neural network that receives the intermediate image as an input and generates a fusion output, feeding back the fusion output for input to the denoising neural network for non-final iterations, and outputting the fusion output as a fusion image output that is an RGB output image having features from both the RGB image and the IR image, using a series of convolution layers, in the enhancement neural network, to convolute the intermediate image to generate a condition vector that identifies global features, using a plurality of layers in the enhancement neural network, each layer in the plurality of layers having a convolution layer, an adaptive group normalization block, a feature modulation block, and an activation block that generates an output to a next layer in the plurality of layers, and using a final layer in the plurality of layers to generate the fusion output, and a first layer in the plurality of layers receiving the intermediate image, and embedding a timestep by scaling the timestep to generate a scaled timestep that is multiplied with an output of the convolution layer in the enhancement neural network that is normalized in the adaptive group normalization block. The feature modulation block receives the condition vector and scales the condition vector to modulate global features processed by the feature modulation block. The RGB image thus is fused with the IR image by denoising and global feature modulation.

The ABR block is for receiving an input to the ABR block at a first layer and having a convolution layer generating a first layer output to a next layer. The convolution layer in the first layer is a 1×1 bottleneck convolution layer. One or more intermediate layers each receive a layer output from a prior layer and each have a convolution layer generating a layer output. The ABR block receives at a last layer the layer output for a last layer of the one or more intermediate layers and uses a convolution layer to generate a last layer output. The ABR block also is for receiving the input to the ABR block at a bottleneck convolution layer and generating a bottleneck convolution output. An ABR adder is sued to add the bottleneck convolution output to the last layer output to generate an output of the ABR block, and a normalizer in each layer normalizes an input to the layer.

One or more normalizers in the ABR block is an adaptive group normalization block. Each adaptive group normalization block is for linearizing the timestep, forming groups from the timestep, generating a scale factor from the groups from the timestep, generating a bias from the groups from the timestep, normalizing an input to the adaptive group normalization block to generate a normalized dataset, multiplying the normalized dataset by the scale factor to generate a scaled normalized dataset, and adding the bias to the scaled normalized dataset to generate an output of the adaptive group normalization block.

Using the denoising neural network includes using spatial attention blocks that precede ABR blocks having an up-sampler or a down-sampler in lower levels of the UNet CNN.

Using the enhancement neural network includes up-sampling the intermediate image for input to the first layer in the enhancement neural network and using the feature modulation block to modulate global features identified by the condition vector, Thus the enhancement neural network performs Super-Resolution Global Feature Modulation (SFGFM).

A multiple-modality image fusion system has a computer or a machine with circuitry to implement a denoising neural network that receives a color image having pixels representing multiple colors, and that receives a non-visible-light image having mono-color pixels generated by a non-visible-light detector, and that receives a Gaussian noise image for an initial iteration, and that receives a feedback image for non-initial iterations. The denoising neural network generates an intermediate image as an output. The computer or the machine also has circuitry to implement an enhancement neural network that receives the intermediate image from the denoising neural network and that generates the feedback image.

The denoising neural network further includes a convolution neural network having contracting layers and expansion layers that form a U-net. The convolution neural network further includes an input layer that receives the color image, the non-visible-light image, and receives the Gaussian noise image for the initial iteration and receives the feedback image for the non-initial iterations. The input layer outputs a dataset with spatial pixel-derived data and feature-depth data.

The convolution neural network further includes a series of contracting layers after the input layer, each contracting layer having an Adaptive Bottleneck Residual (ABR) block. The convolution neural network further includes a series of expansion layers, each expansion layer having a concatenation layer that concatenates an output from a preceding expansion layer with an output from a contracting layer, and an ABR block in each expansion layer, a bottom layer having ABR blocks and spatial attention blocks, the bottom layer receiving a dataset from a lowest-level contracting layer, and outputting a dataset to a lowest-level expansion layer, and an output layer that receives an output from a last of the series of expansion layers, and outputs the intermediate image.

The ABR block has an input tensor, an output tensor, a bypass bottleneck convolution block receiving the input tensor and outputting a bypass dataset, an adder that adds a primary dataset to the bypass dataset to generate the output tensor, a first normalizer that normalizes the input tensor, a first activation block that executes an activation function on an output of the first normalizer to generate a first convolution input, a first bottleneck convolution block that convolutes the first convolution input to generate a first convolution output, a second adaptive normalizer that normalizes the first convolution output, a second activation block that executes an activation function on an output of the second adaptive normalizer to generate a second convolution input, a second convolution block that convolutes the second convolution input to generate a second convolution output, a third adaptive normalizer that normalizes the first convolution output, a third activation block that executes an activation function on an output of the third adaptive normalizer to generate a third convolution input, a third convolution block that convolutes the third convolution input to generate a third convolution output, a fourth adaptive normalizer that normalizes the first convolution output, a fourth activation block that executes an activation function on an output of the fourth adaptive normalizer to generate a fourth convolution input, a fourth bottleneck convolution block that convolutes the fourth convolution input to generate the primary dataset, a timestep embedder that outputs a timestep to the second adaptive normalizer, the third adaptive normalizer, and the fourth adaptive normalizer that embed the timestep into the second convolution input, the third convolution input, and the fourth convolution input.

The enhancement neural network also includes a series of convolution blocks that receives the intermediate image and outputs a condition vector, a first enhancement convolution block that convolutes the intermediate image to generate a first convolution result, a first enhancement normalizer that normalizes the first convolution result and embeds the timestep to generate a first normalized result, a first feature modulation block that modulates global features in the first normalized result to generate a first modulated result, wherein the global features are modulated in response to the condition vector, a first enhancement activation block that executes an activation function on the first modulated result to generate a second enhancement convolution input, a second enhancement convolution block that convolutes the second enhancement convolution input to generate a second convolution result, a second enhancement normalizer that normalizes the second convolution result and embeds the timestep to generate a second normalized result, a second feature modulation block that modulates global features in the second normalized result to generate a second modulated result, wherein the global features are modulated in response to the condition vector, a second enhancement activation block that executes an activation function on the second modulated result to generate a third enhancement convolution input, a third enhancement convolution block that convolutes the third enhancement convolution input to generate a third convolution result, a third enhancement normalizer that normalizes the third convolution result and embeds the timestep to generate a third normalized result, and a third feature modulation block that modulates global features in the third normalized result to generate the feedback image. The global features are modulated in response to the condition vector.

The multiple-modality image fusion system also has an up-sampler that up-samples the intermediate image before input to the first enhancement convolution block. The enhancement neural network performs super-resolution global feature modulation.

BRIEF DESCRIPTION OF THE DRAWINGS

FIGS. 2A-2D show image fusion using a prior-art encoder-decoder based Convolution Neural Network (CNN).
FIGS. 3A-3D show image fusion using other prior-art methods.
FIG. 16 shows training a neural network such as the neural networks of FIGS. 5-12.

DETAILED DESCRIPTION

The present invention relates to an improvement in image fusion neural networks. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 4:
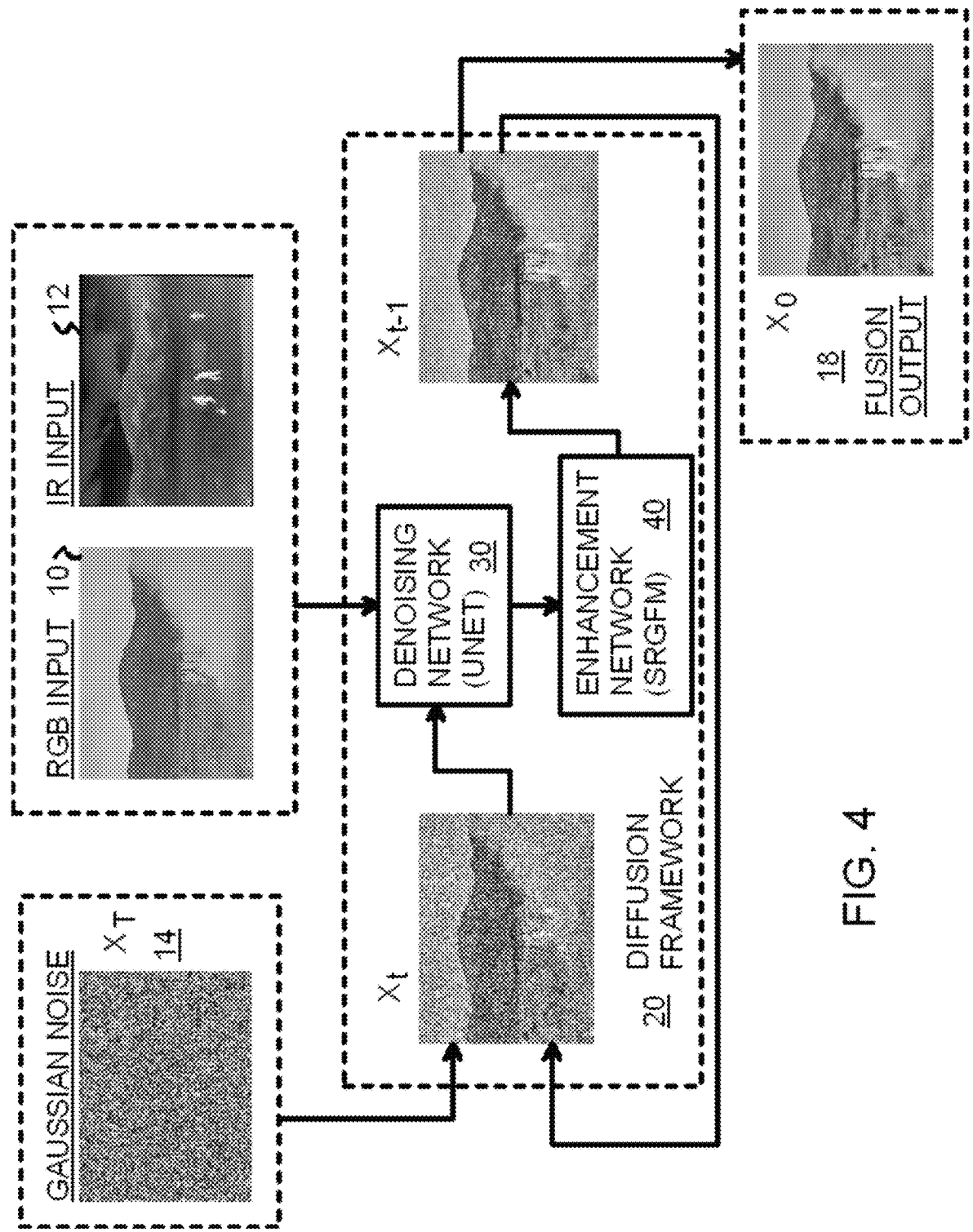
FIG. 4 is an overview of a multiple-modality image fusion system with an image-guided diffusion framework.

FIG. 4 is an overview of a multiple-modality image fusion system with an image-guided diffusion framework. RGB image 10 and IR image 12 are images captured by an RGB camera and an IR camera. RGB image 10 and IR image 12 can be images captured at a same time index in the RGB and IR video streams.

Gaussian noise image 14 is generated based on random noise and is concatenated with RGB image 10 and IR image 12 and input to denoising network 30, which is a U-shaped Convolution Neural Network (Unet). Gaussian noise image 14 is pure Gaussian noise and is designated $X_T$, where T is a maximum number of iterations, such as 1000. The current iteration parameter t begins at 1000 for the initial iteration and ends at 0 for the final iteration.

After the current iteration is de-noised by denoising network 30, then enhancement network 40 uses Super-Resolution Global Feature Modulation (SRGFM) to enhance the denoised image from denoising network 30 to generate the next iteration image, $X_{t-1}$. This output image for iteration $X_{t-1}$ is fed back as next iteration image $X_t$, to be concatenated with RGB image 10 and IR image 12 and again input to denoising network 30 for the next iteration t.

RGB image 10 and IR image 12 are concatenated with a feedback image from a prior iteration to produce a noise-injected image that is input for iteration $X_t$ to denoising network 30. As more iterations are processed, the feedback image $X_t$ becomes less and less noisy, as shown in FIG. 5.

Denoising is performed by denoising network 30 that receives the feedback image $X_t$, and RGB image 10 and IR image 12 as a concatenated input. Denoising network 30 and enhancement network 40 are each neural networks, that form diffusion network 20. Denoising network 30 and enhancement network 40 operate for many iterations until the final iteration is reached at t=0. Then the final image from enhancement network 40 is output as fusion output 18. Fusion output 18 can be used by other systems, such as for object tracking and identification, surveillance, or self-driving.

Figure 5:
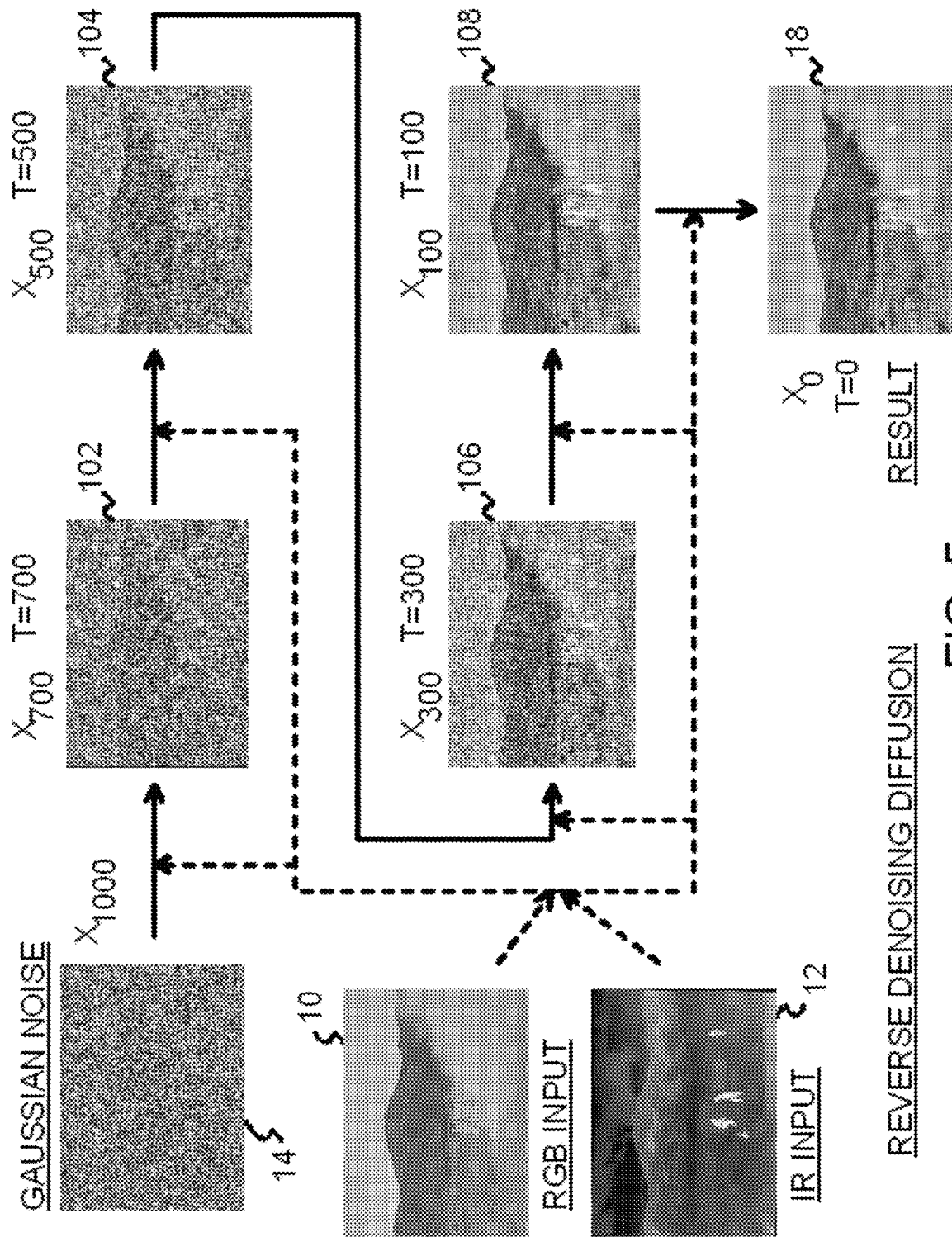
FIG. 5 illustrates the image-guided diffusion network.

FIG. 5 illustrates the image-guided diffusion network. In this example diffusion network 20 is operating over T=1000 iterations, from first iteration t=1000 down to final iteration t=0. The current iteration parameter t counts down rather than counting up because diffusion network 20 performs reverse diffusion, where noise is removed with successive iterations.

For the first iteration t=1000, Gaussian noise image 14 is combined with RGB image 10 and IR image 12 and then input to denoising network 30. After each iteration through denoising network 30 and enhancement network 40 of diffusion network 20, the resulting image is fed back and concatenated with RGB image 10 and IR image 12, and the combination is input to denoising network 30 for the next iteration. RGB image 10 and IR image 12 act as signal guidance since they are re-input for each iteration. Gradually as the number of iterations increases, the resulting image output from diffusion network 20 becomes less noisy and more like the original input images RGB image 10 and IR image 12, except they are blended together into a single image with both RGB and IR features.

Image 102, which results at t=700 after 300 iterations, is mostly noise. Image 104, after 500 iterations, is half noise, but some image features, such as mountains, are becoming visible. Image 106, at t=300, after 700 iterations of processing by diffusion network 20, has less noise and more distinct features, and persons in the smoke are just starting to become visible. Image 108, at t=100, after 900 iterations, has most of the noise removed, and persons both outside and inside the smoke plume are visible.

Finally, at t=0, after 1000 iterations, fusion output 18 is generated form diffusion network 20. Details of the grass and smoke from RGB image 10 are visible, and details from IR image 12, such as the person standing within the smoke on the right, are combined into fusion output 18.

Diffusion network 20 injects Gaussian noise image 14 at the first iteration, and then re-injects RGB image 10 and IR image 12 as guidance signals for all iterations of diffusion until the noise from Gaussian noise image 14 is mostly removed in the final result after many iterations, fusion output 18. Diffusion network 20 thus performs image-guided reverse denoising diffusion to fuse the RGB and IR input images.

Figure 6A:
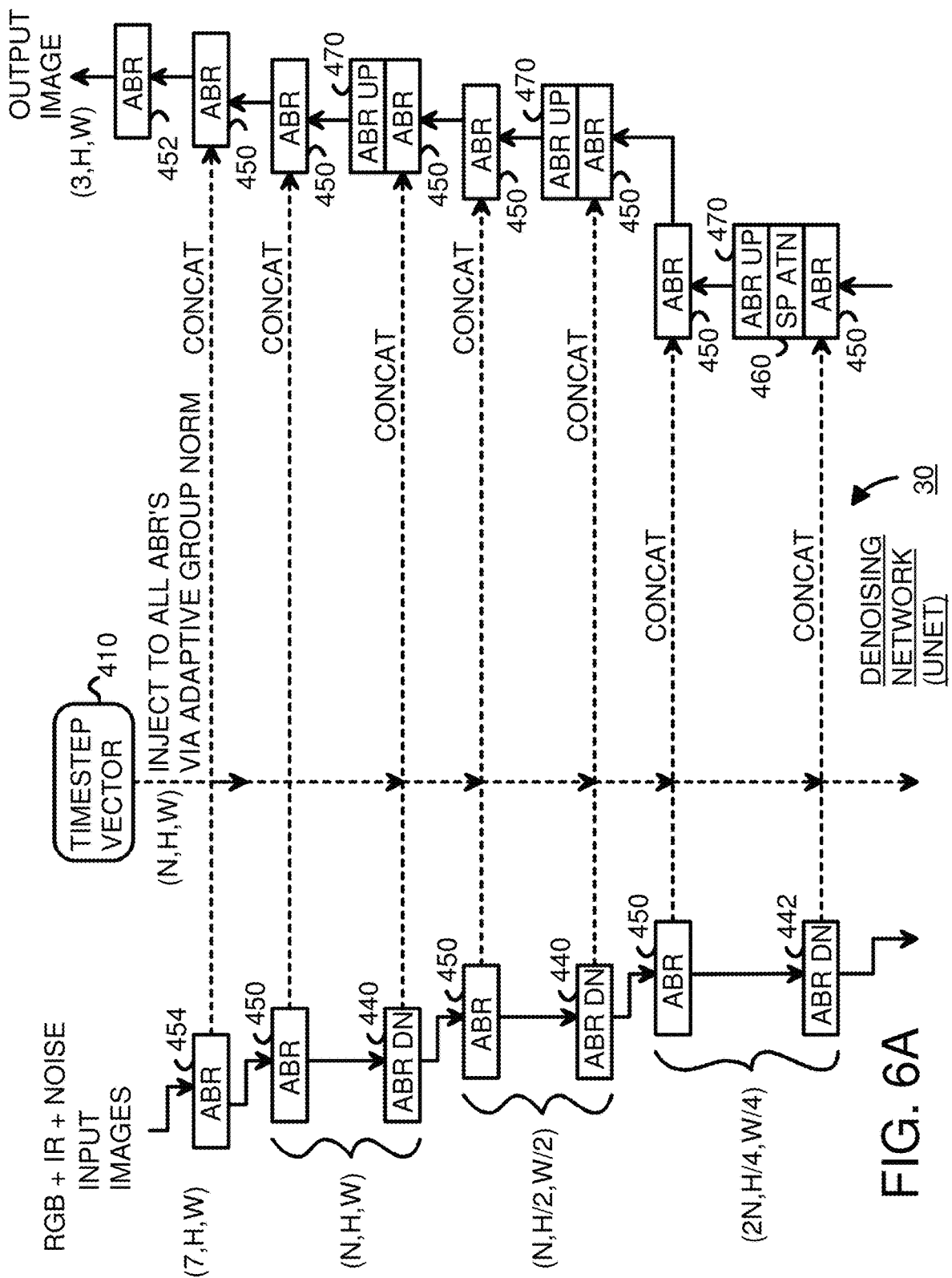
FIGS. 6A-6B is a block diagram of the denoising network in more detail.
Figure 6B:
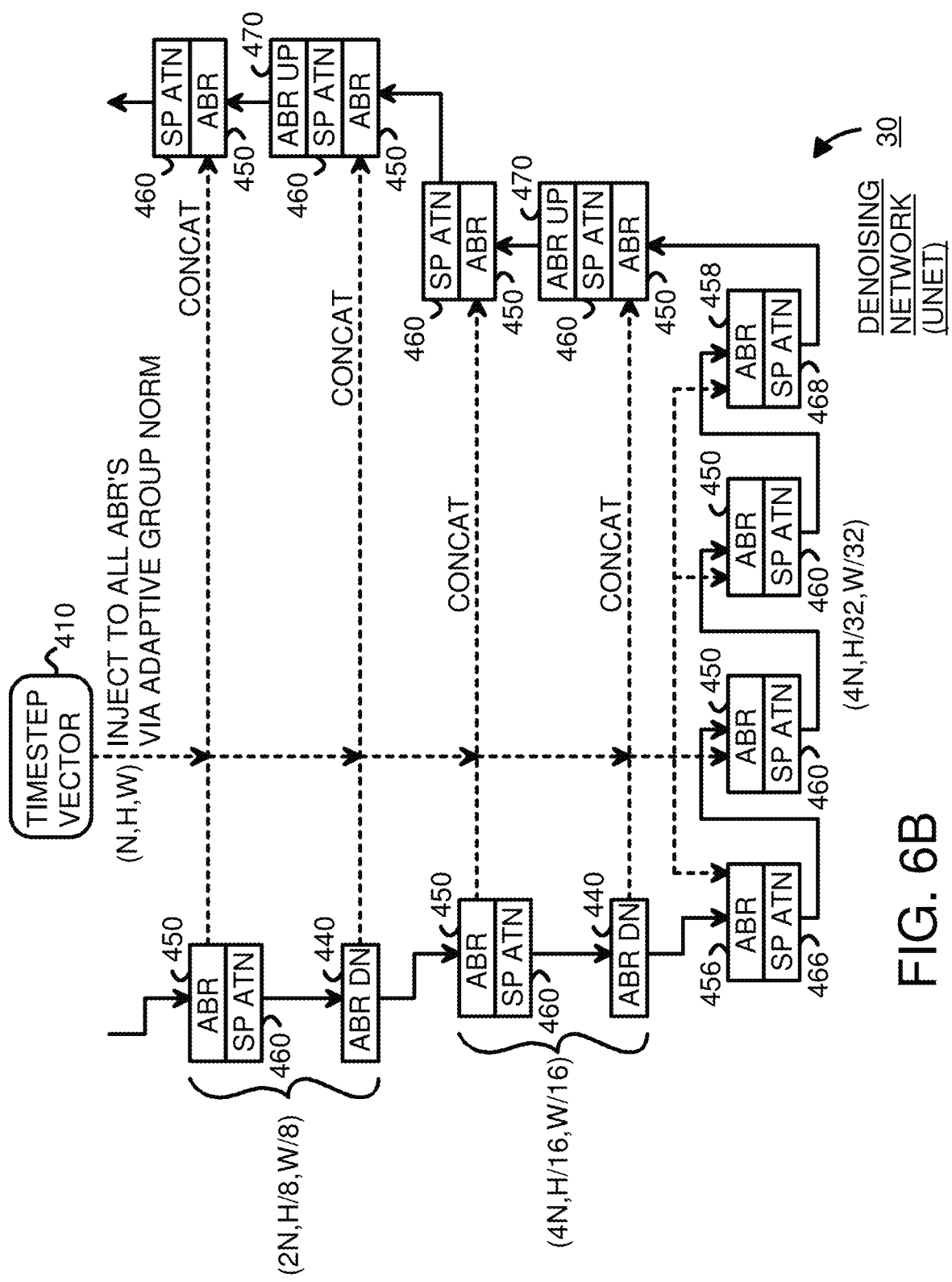

FIGS. 6A-6B is a block diagram of the denoising network in more detail. Denoising network 30 (FIG. 4) is a Convolutional Neural Network (CNN) with a U-Net architecture. A U-shape network is formed by a contracting path (left side of FIGS. 6A, 6B) of contracting layers of Adaptive Bottleneck Residual (ABR) blocks 440, 450 that each perform adaptive down sampling and that successively reduce spatial information and increase feature (depth) information, and an expanding path (right side of FIGS. 6A, 6B) of expansion layers of Adaptive Bottleneck Residual (ABR) blocks 440, 450 that each perform adaptive down sampling and that successively increase spatial information while decreasing feature depth.

The spatial information can be based on a frame of pixels of height H and width W, such as 480×480 pixels. The frame size is reduced by successive contracting layers that end with ABR down-sampling block 440, while the feature depth is expanded by features extracted by each layer until the bottom of the U shape is reached at spatial attention blocks 460, 466, 468, each preceded by their ABR block 450, 456, 458, respectively.

Then the frame size is increased, and the depth is reduced as feature information in the depth is converted to spatial pixel data by expansion layers that end with ABR up-sampling block 470. ABR up-sampling block 470 is preceded by spatial attention block 460 and is followed by ABR block 450 in lower levels (FIG. 6B), and at higher levels (FIG. 6A), ABR up-sampling block 470 is preceded by ABR block 450 and is followed by ABR block 450. Spatial attention blocks 460 also precede ABR down-sampling blocks 440 in the lower levels of the contracting path (FIG. 6B, left).

For example, each of RGB image 10, IR image 12, and Gaussian noise image 14 could be a frame of H×W pixels. The 3 images are concatenated to have a feature depth of (7, H, W), where RGB image 10 and Gaussian noise image 14 each have R, G, and B pixel components while IR image 12 has only one (IR) pixel component, for a total of 7 features or 7 channels. The concatenated 3 input images (7, H, W) are input to input ABR block 454 for the first iteration. For later iterations, the image output is fed back and concatenated with RGB image 10 and IR image 12 and input to ABR block 454.

After processing by input ABR block 454, the feature depth is (n, H, W). The number of channels, channel base number n, determines the model width and is adjustable. More complex models can use a higher value of n than simpler models. As the denoising neural network extracts features on the left side of the U-net, n increases while the feature map size H, W decreases.

After processing by ABR block 450, ABR down-sampling block 440 reduces the frame from H×W to H/2×W/2, or (n, H, W) to (n, H/2, W/2) feature depths, for the next level. Then frame size continues to decrease with each ABR down-sampling block 440. Spatial attention blocks 460 are also present at lower levels.

Spatial contraction and depth increase continue for contracting layers with input datasets of (2n, H/4, W/4) and (2n, H/8, W/8) and (4n, H/16, W/16), respectively. Finally, the last contracting layer outputs a dataset of (4n, H/32, W/32) to bottom-level ABR block 456. At this point, each spatial point corresponds to one 32×32 macroblock in the original image frame. However, 4 times more depth features are stored for this one spatial point.

Then the expansion layers of ABR up-sampling block 470 expand the spatial data using feature data while reducing feature-map depths at spatial attention blocks 460. The depth decreases and the frame sizes increase, from (4n, H/32, W/32), to (4n, H/16, W/16), then (2n, H/8, W/8), and (2n, H/4, W/4) until output ABR block 452 outputs a fused image of (3, H, W). This output image is then sent to enhancement network 40 for further processing.

Each of the contracting and expanding layers has an ABR block that is specially modified to perform fusion operations. ABR block 450 is shown in more detail in FIG. 7. A modified ABR block 450 uses an adaptive group normalization block 230 that is shown in FIG. 8. Each ABR block 450, 456, 458 is injected with timestep vector 410 through its adaptive group normalization block 230. Timestep vector 410 has a feature depth of (n, H, W). Thus, timestep vector 410 is an n-dimensional time vector that is injected at every residual block as a guidance signal using adaptive group normalization block 230 for injection.

Also, the residual image at a level from the contracting layer is concatenated with the residual image from the expanding layer and input to ABR block 450 in the expanding layer (right side of FIGS. 6A-6B). This improves performance.

Spatial attention blocks 460 help highlight important parts of a feature map. Performance is improved by paying attention to these features highlighted by spatial attention blocks 460. Spatial attention block 460 is applied when the output of an ABR block is H/8, W/8 or less.

Spatial attention blocks 460 first flatten the 2D feature map to a 1D vector, then apply standard Queries, Keys, Values (QKV) scaled-dot product attention to the vector, and finally reconstruct the attention re-weighted 1D vector back to its original 2D feature map shape.

Figure 7:
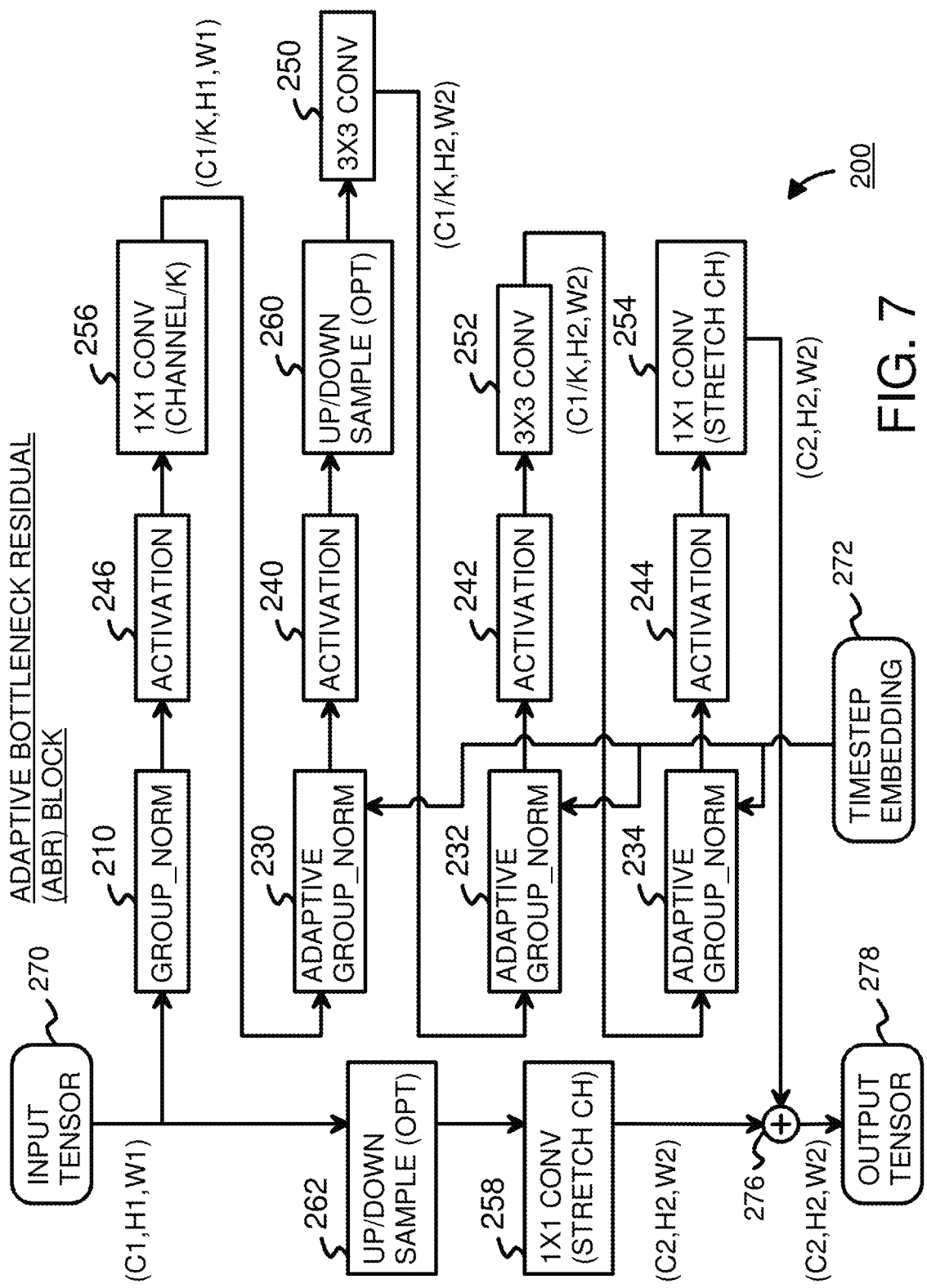
FIG. 7 shows the ABR block in more detail.
Figure 8:
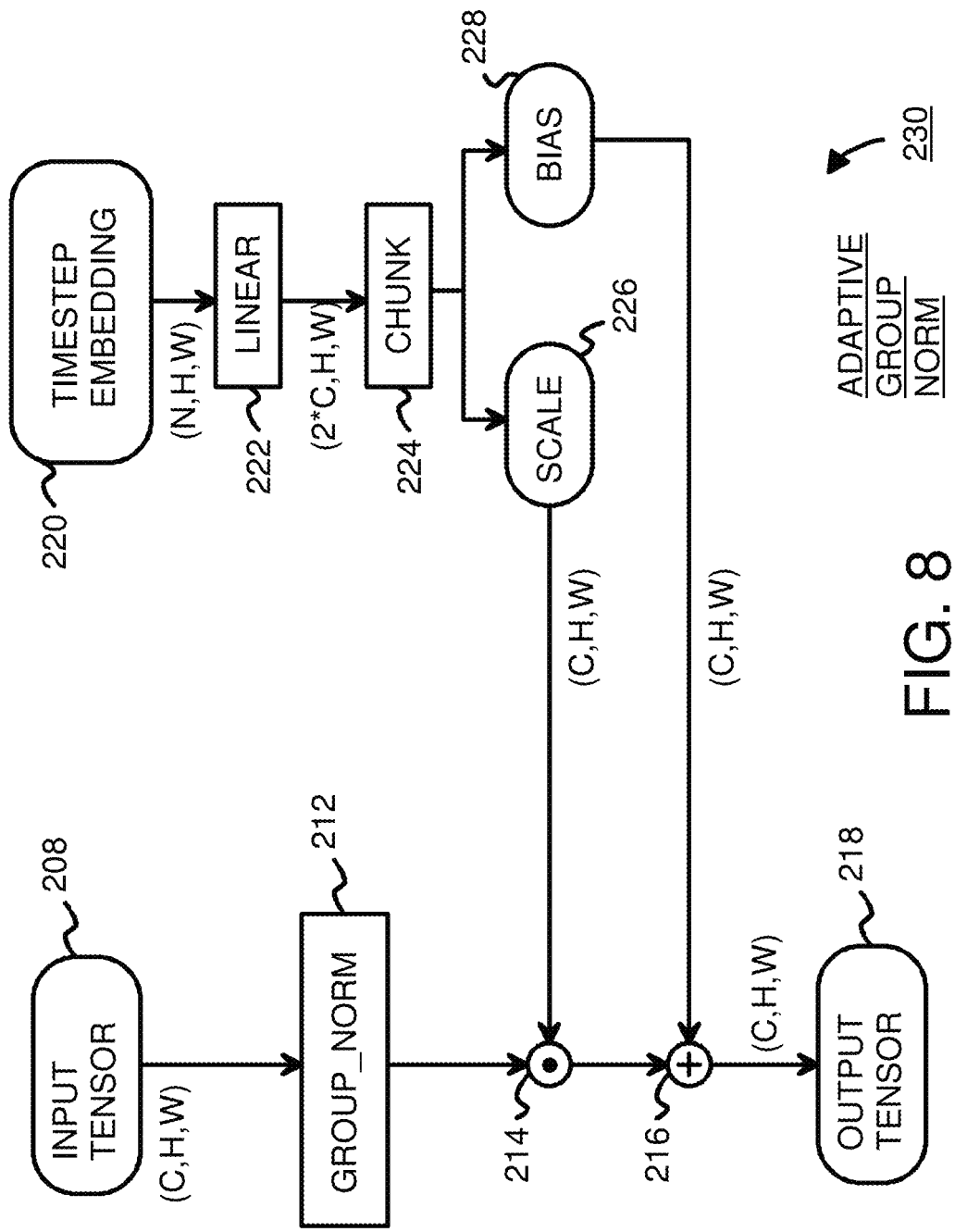
FIG. 8 shows the adaptive group normalization block in more detail.

FIG. 7 shows the ABR block in more detail. ABR block 450, 452, 454, 456, 458 of FIGS. 6A-6B are constructed from ABR block 200 shown in FIG. 7. ABR down-sampling block 440 and ABR up-sampling block 470 also are constructed from ABR block 200, but also perform down-sampling or up-sampling.

Optional up/down sampling blocks 260, 262 are enabled for down-sampling for ABR down-sampling block 440 and are enabled for up-sampling for ABR up-sampling block 470, but up/down sampling block 260, 262 are disabled for ABR block 450, 452, 456, 458. Thus up/down sampling blocks 260, 262 are enabled when changing feature map resolutions but are otherwise disabled. Up/down sampling blocks 260, 262 perform 2× up/down sampling and can use any up/down sampling operators, such as nearest-neighbor, average pooling, etc.

ABR block 200 converts input tensor 270 of C1 channels, H1 height, and W1 width, to output tensor 278 of C2 channels, H2 height, and W2 width. Input tensor 270 is optionally up or down sampled by up/down sampling block 262, and then convoluted by 1×1 convolution 258 and added to a convolution output by adder 276 to generate output tensor 278 that has C2 channels, H2 height, and W2 width.

1×1 convolution 258, 254 stretch the number of channels from C1 to C2. Thus adder 276 adds two inputs, each of (C2, H2, W2).

Input tensor 270 is also sent to four levels of convolution processing. Each level has a group normalization block, an activation block, and a convolution block.

Figure 1:
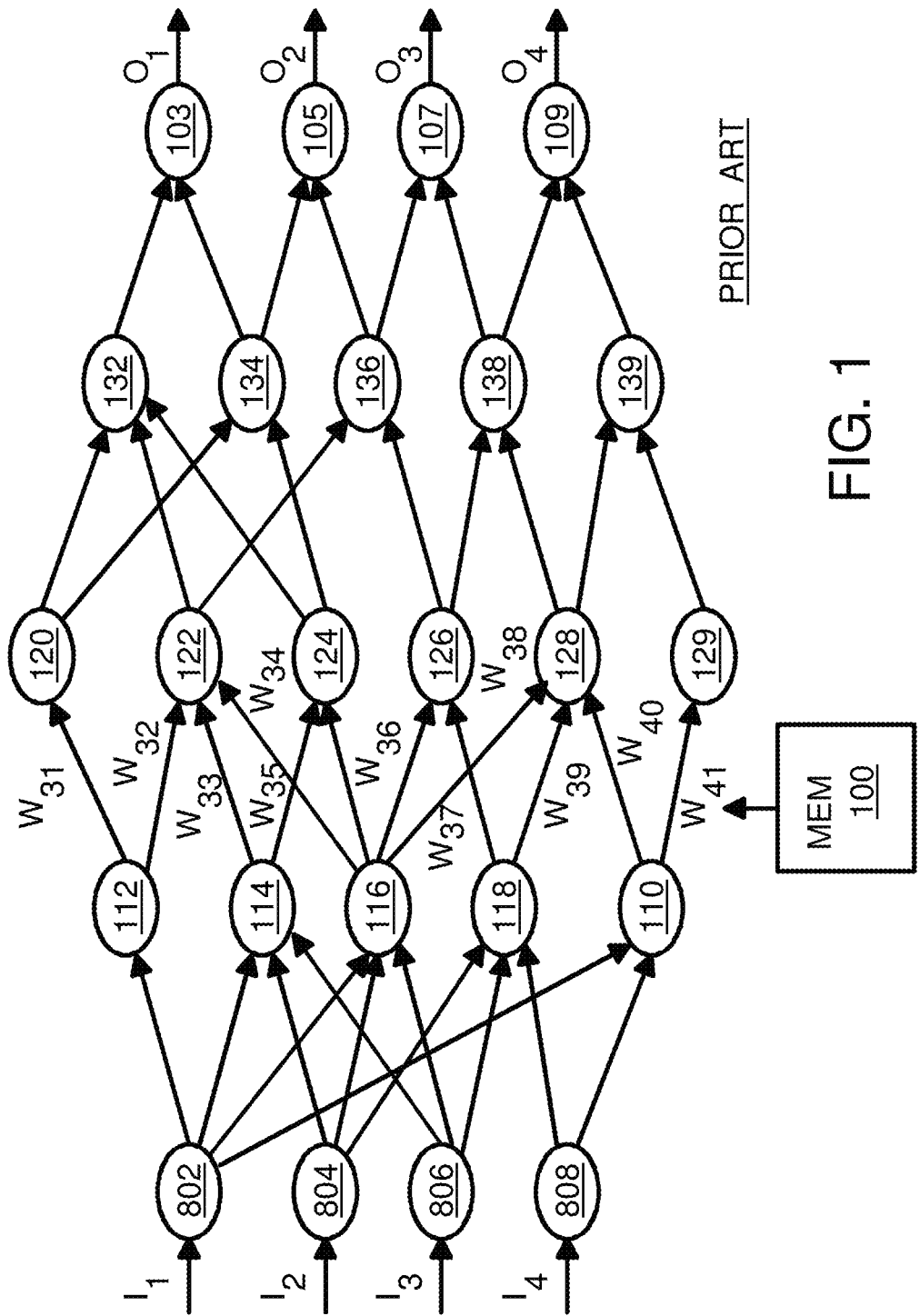
FIG. 1 illustrates a prior art neural network.

The first (top) level has group normalization block 210, activation block 246, and 1×1 convolution 256, which outputs (C1/k, H1, W1) to the second level. Group normalization block 210 is a normalization layer that divides or organizes channels into groups and normalizes features within each group. Activation block 246 performs an activation function on the inputs to generate outputs. The activation function can be a non-linear transfer function, rectifier, or can multiply inputs by the neural network weights (FIG. 1) that are adjusted by machine learning. 1×1 convolution 256 is a convolution layer in a convolution neural network that shrinks the number of channels by 1/k and can be considered bottleneck convolution. Bottleneck convolution shrinks the feature map by k, compressing the neural network parameter counts and reducing computational complexity.

The second level has an adaptive group normalization block, adaptive group normalization block 230, activation block 246, optional up/down sampling block 260, and 3×3 convolution 250, which outputs (C1/k, H2, W2) to the third level.

Shown in detail in FIG. 8, adaptive group normalization block 230 has a group normalization block with a normalization layer that divides or organizes channels into groups and normalizes features within each group. Adaptive group normalization block 230 also embeds the timestep, such as timestep vector 410 (FIG. 6A) through timestep embedding 272.

The third level also has an adaptive group normalization block, adaptive group normalization block 232, activation block 242, and 3×3 convolution 252, which outputs (C1/k, H2, W2) to the fourth level.

The fourth level has adaptive group normalization block 234, activation block 244, and 1×1 convolution 254, which stretches the channels from C1/k to C2 and outputs (C2, H2, W2) to adder 276.

The timestep is injected through timestep embedding 272 and adaptive group normalization blocks 230, 232, 234 before convolution 250, 252, 254. Thus, the timestep in injected into three bottleneck convolution results.

Adder 276 provides a residual connection, adding linearly stretched input tensor 270 to the neural-network-processed result from convolution 254. This residual connection improves training stability and speeds convergence.

FIG. 8 shows the adaptive group normalization block in more detail. Adaptive group normalization block 230 is used to inject the iteration number t or timestep into the convolutions of ABR block 200 (FIG. 7) for all ABR blocks 450, 452, 454, 456, 458 (FIG. 6A-6B). Thus, the timestep is embedded at many levels of the Unet CNN of denoising network 30.

Input tensor 208 is a multi-dimensional dataset having C channels, and image data of H×W. Input tensor 270 is input to group normalization block 212 which is a normalization layer that divides or organizes channels into groups and normalizes features within each group.

The timestep vector is a (N, H, W) tensor that is input by timestep embedding 220 and linearized by linear block 222 to (2*C, H, W) and then grouped into chunks by chunking block 224. The chunks of the linearized timestep are scaled by scaler 226 and then multiplied with the normalized output from group normalization block 212. The chunks of the linearized timestep have a bias added by bias block 228 and then added by adder 216 to the scaled normalized output from multiplier 214 to generate output tensor 218, which also has dimensions of (C, H, W).

Adaptive group normalization block 230 provides timestep embedding using channel-wise linear stretching and chunking of the timestep. A timestep guided bias and scale are generated from the timestep and applied to the normalized output from group normalization block 212. Adaptive group normalization block 230 generates its output as:

Output=Scale*GroupNorm(Input)+Bias.

Figure 9:
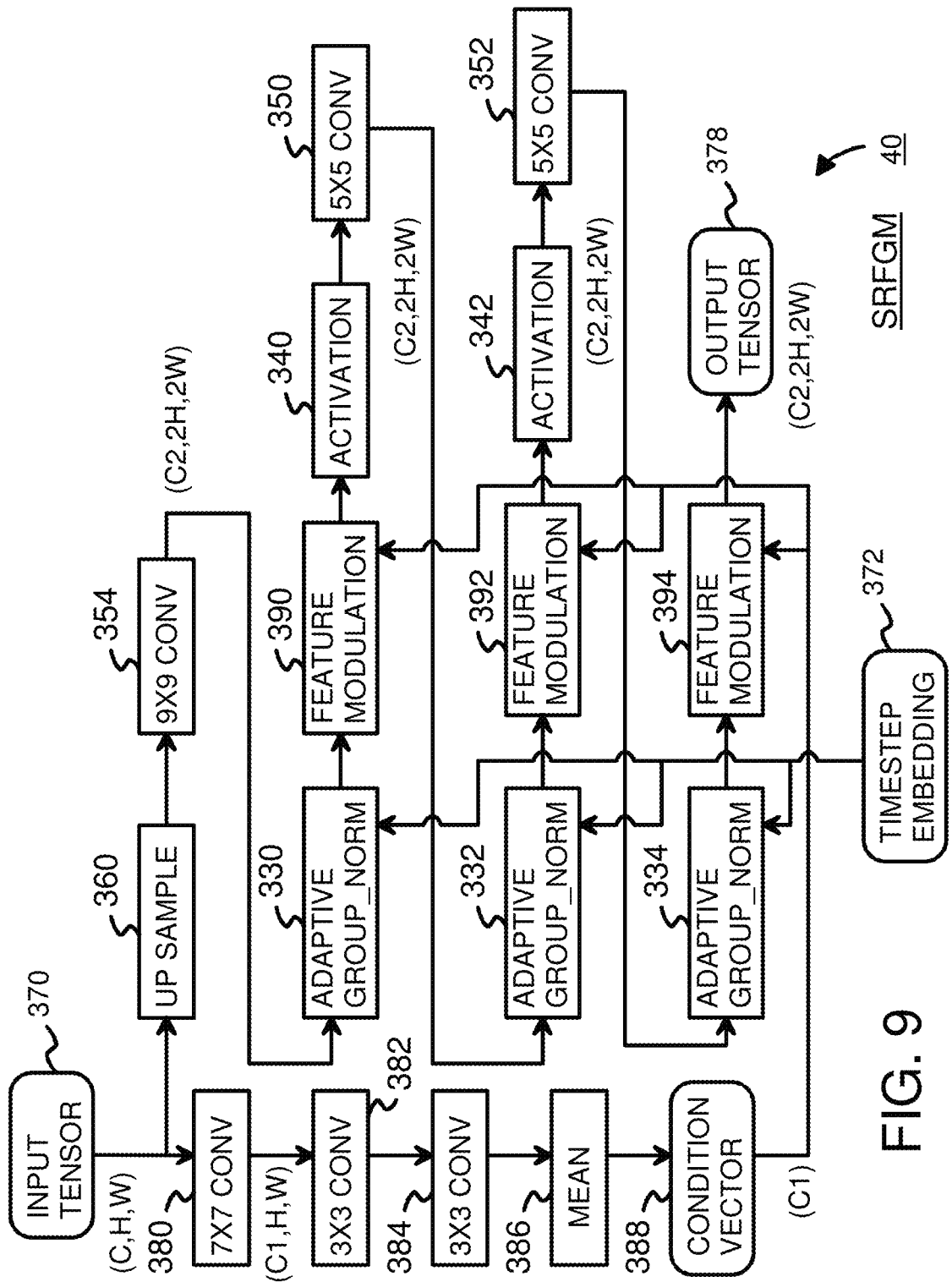
FIG. 9 is a block diagram of the enhancement network.

FIG. 9 is a block diagram of the enhancement network. Super-Resolution Global Feature Modulation (SRFGM) network 40 is a second Convolution Neural Network (CNN) that implements enhancement network 40 (FIG. 4). Input tensor 370 is taken from the output image (FIG. 6A, upper right) that is the output result generated by denoising network 30, which is a first CNN. Input tensor 370 has C channels of H×W image data.

Input tensor 370 represents an RGB image. The IR image data from IR image 12 was fused with RGB image 10 by denoising network 30 to generate its output image, which has only RGB data that can be displayed to a person. The IR information was thus fused into the RGB information by denoising network 30.

This RGB image from input tensor 370 passes through three convolution layers, and is then averaged to generate condition vector 388. Input tensor 370 is input to 7×7 convolution layer 380, which convolutes the (C, H, W) image into a (C1, H, W) image that is then convoluted further by 3×3 convolution layers 382, 384 and then averaged by mean block 386 to generate condition vector 388, which has C1 feature channels but no H×W image data.

Condition vector 388 is applied to feature modulation blocks 390, 392, 394, which scale and bias condition vector 388 to modulate feature maps. Global features identified by condition vector 388 and present in feature maps at three convolution layers are modulated using feature modulation blocks 390, 392, 394, providing Global Feature Modulation (GFM). The three convolution layers are 9×9 convolution layer 354, 5×5 convolution layer 350, and 5×5 convolution layer 352.

The RGB image of input tensor 370 is up-sampled by up-sampler 360 before being input to 9×9 convolution layer 354, which produces a (C2, 2H, 2 W) output to adaptive group normalization block 330.

Adaptive group normalization blocks 330, 332, 334 are each an instance of adaptive group normalization block 230 shown in FIG. 8. Adaptive group normalization blocks 330, 332, 334 scale and bias the timestep from timestep embedding 372 into the normalized datasets. Thus, the timestep is embedded into the datasets by adaptive group normalization blocks 330, 332, 334.

Adaptive group normalization blocks 330, 332, 334 are followed by feature modulation blocks 390, 392, 394, respectively. Condition vector 388 causes feature modulation blocks 390, 392, 394 to modulate global features in the datasets output by adaptive group normalization blocks 330, 332, 334, respectively.

The dataset with modulated global features that is output from feature modulation block 390 is input to activation block 340, which activates data for enhancement. The activated dataset from activation block 340 is input to 5×5 convolution layer 350, which convolutes the dataset and sends (C2, 2H, 2 W) dataset to adaptive group normalization block 332 in the third level.

In the third level of FIG. 9, the dataset with modulated global features that is output from feature modulation block 392 is input to activation block 342, which activates data for enhancement. The activated dataset from activation block 342 is input to 5×5 convolution layer 352, which convolutes the dataset and sends (C2, 2H, 2 W) dataset to adaptive group normalization block 334 in the fourth level.

In the fourth level of FIG. 9, adaptive group normalization block 334 embeds the timestep and feature modulation block 394 uses condition vector 388 to modulate global features. The GFM output from feature modulation block 394 is output as output tensor 378, which has C2 channels of 2H×2 W image data that is the RGB fusion image, fusion output 18 (FIG. 4).

Super Resolution (SR) is provided by initially up-sampling the input image by up-sampler 360. Large kernel 9×9 convolution layer 354 and 5×5 convolution layers 350, 352 extract large receptive field global information. These large, global features are then modulated by feature modulation blocks 390, 392, 394 according to global image features in condition vector 388. Both condition vector 388 and the timestep are modulated and embedded into the intermediate feature maps. Global Feature Modulation (GFM) and Super-Resolution are both provided by enhancement network 40. Enhancement network 40 is a SRGFM Convolution Neural Network.

Figure 10:
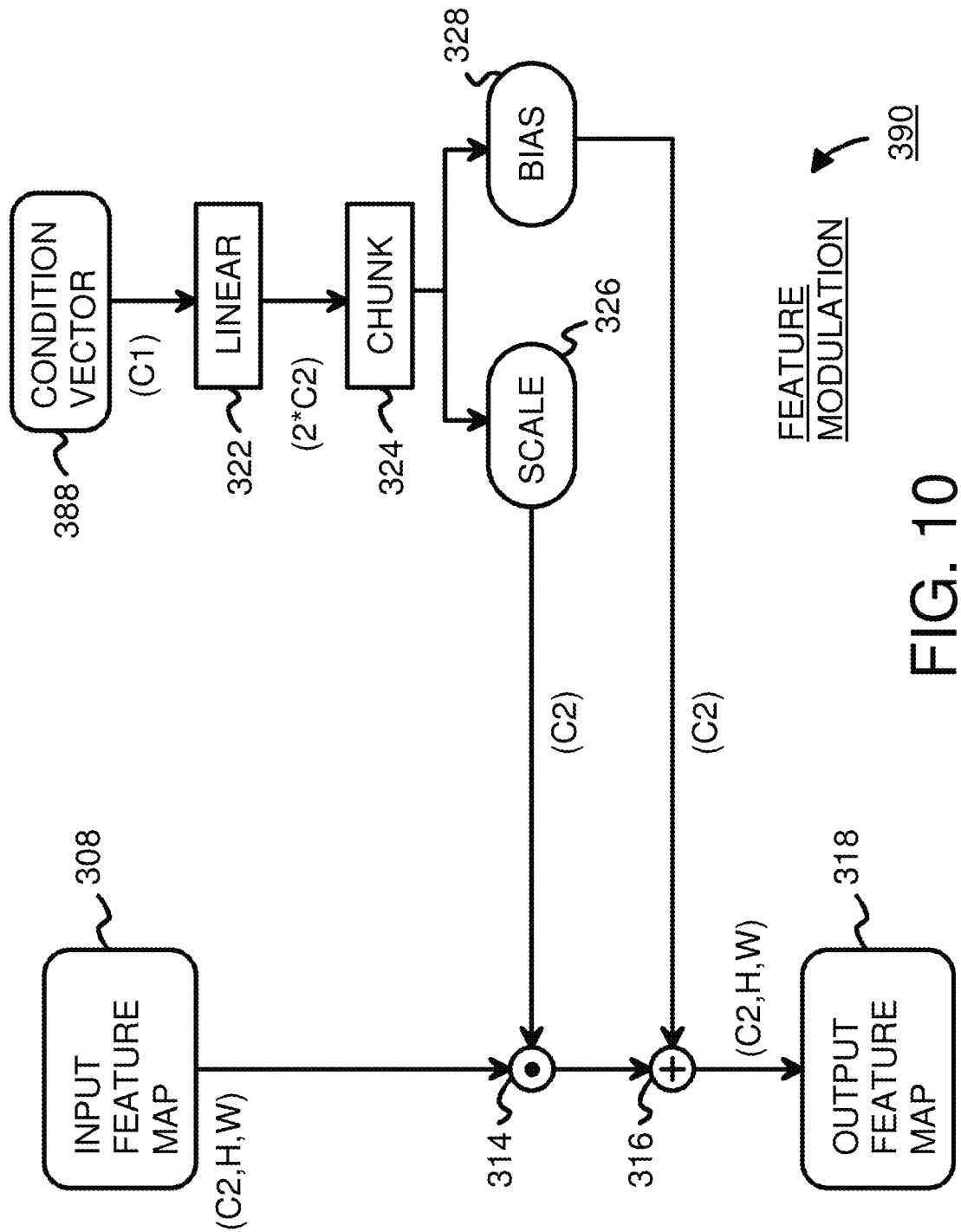
FIG. 10 shows the feature modulation block in more detail.

FIG. 10 shows the feature modulation block in more detail. Feature modulation block 390 modulates global features identified by condition vector 388 that are present in input feature map 308. Input feature map 308 is a multi-dimensional dataset having C2 channels, and image data of H×W.

Condition vector 388 is a vector of C1 channels and no H×W image data. Condition vector 388 is linearized by linear block 322 to (2*C2) and then grouped into chunks by chunking block 324. The chunks of the linearized condition vector are scaled by scaler 326 and then multiplied with input feature map 308 by multiplier 314, which performs element-wise multiply and add.

The chunks of the linearized condition vector have a bias added by bias block 328 and then added by adder 316 to the scaled output from multiplier 314 to generate output feature map 318, which also has dimensions of (C2, H, W).

Feature modulation block 390 provides condition vector embedding using channel-wise linear stretching and chunking of condition vector 388. A condition vector guided bias and scale are generated from the stretched and chunked condition vector and applied to input feature map 308 to modulate matching global features. Feature modulation block 390 generates its output as:

Output=Scale*(Feature Map)+Bias.

Each convolution layer's feature map is global-feature modulated by feature modulation block 390 in the first convolution layer from 9×9 convolution layer 354, by feature modulation block 392 in the second convolution layer from 5×5 convolution layer 350, and by feature modulation block 394 in the third convolution layer from 5×5 convolution layer 352 (FIG. 9).

Figure 11A:
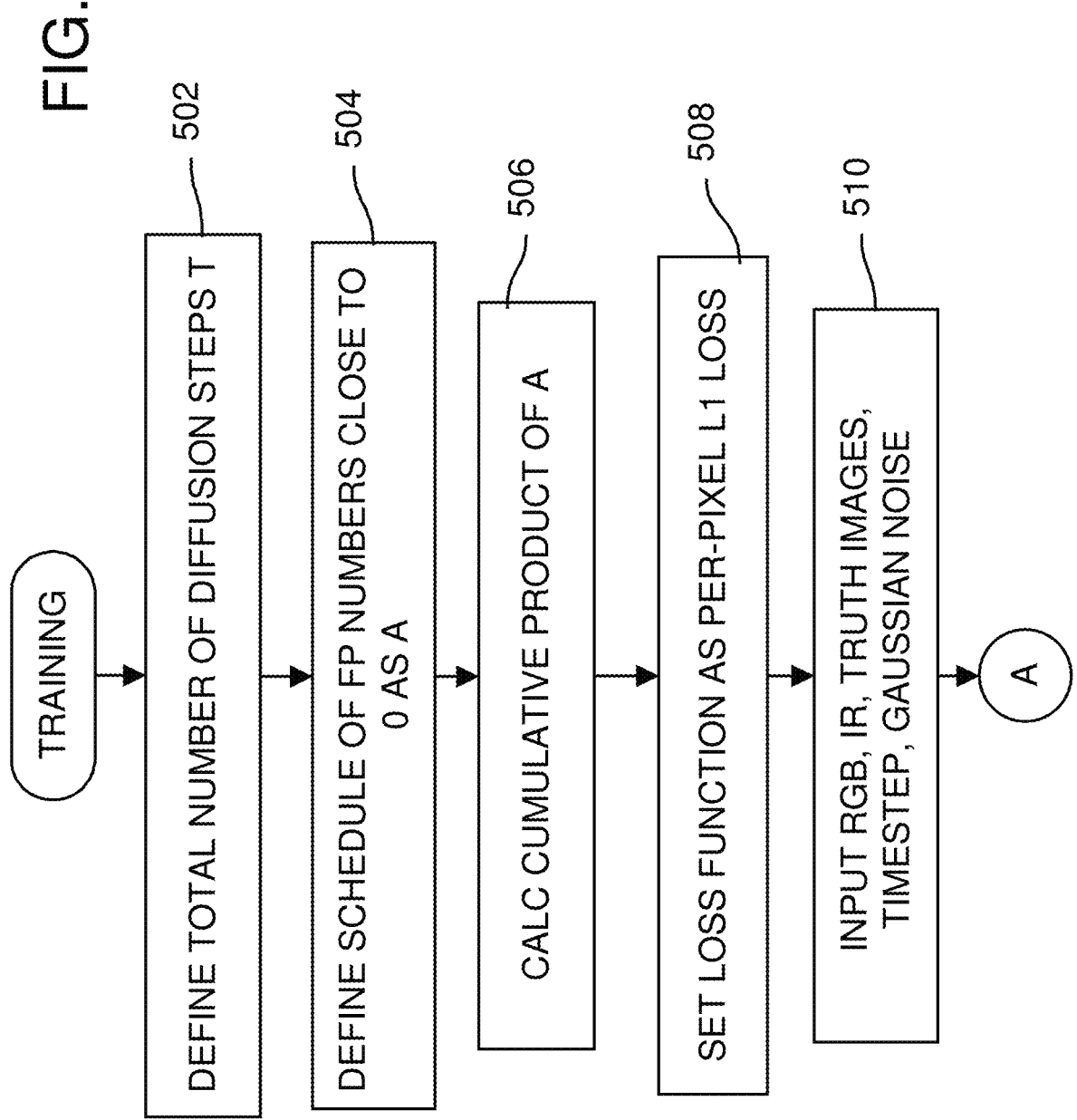
FIGS. 11A-11B show a flowchart of training of the diffusion network.
Figure 11B:
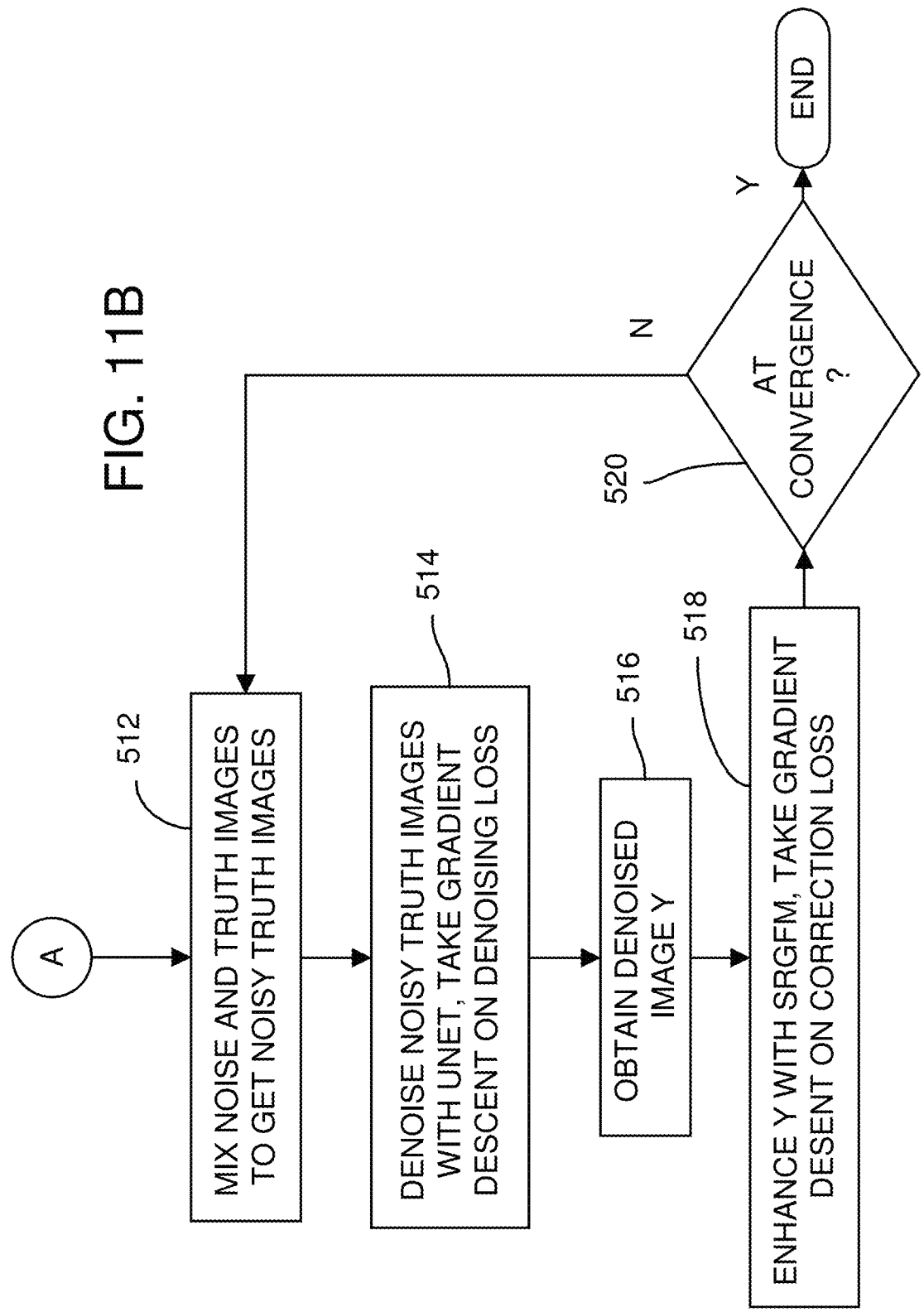

FIGS. 11A-11B show a flowchart of training of the diffusion network. The Convolution Neural Networks (CNN) of denoising network 30 and enhancement network 40 need to be trained before normal operational use. Training compares expected results with the results from the neural networks and updates weights or parameters until a difference or loss is reduced to a target loss.

Training begins by defining a total number of iterations or diffusion steps T, which is a large integer, step 502. For example, T=1000 for our model. In step 504, a schedule $$\{\alpha_t\}_{t=1}^T,$$

which is a series of floating-point numbers close to 1, $a_1 > a_2 > \ldots > a_T$ is set. Its cumulative product $$\{\bar{\alpha}_t\}_{t=1}^T,$$

where $$\bar{\alpha}_t = \prod_0^T \alpha_t$$

is calculated, step 506.

The loss function is set, step 508, as a per-pixel L1 loss. The loss function can be set as:

$$\text{Loss} = \|img1 - img2\|_1 = \frac{1}{n}\sum_{i=1}^n |img1(i) - img2(i)|$$

Where img1 is the result output of diffusion network 20 after both diffusion network 20 and enhancement network 40 have operated in series, and img2 is the expected result from the training images.

Denoising network 30 and enhancement network 40 can be trained at the same time, with the image output from denoising network 30 being input to enhancement network 40. RGB image 10 and IR image 12 are input to denoising network 30, and the expected fusion output image (fusion output 18 that is output by enhancement network 40) is input to the loss function, step 510. This is a set of 3 training images ($x_{rgb}$, $x_{ir}$, $y_{gt}$), which are RGB image 10, IR image 12, and the expected result image (ground truth fusion image). Gaussian noise image 14, Gaussian noise $\epsilon \sim N(0, I)$ is also sampled and input to denoising network 30.

In FIG. 11B, the training routine samples a timestep $t \sim \text{Uniform}(\{1, \ldots, T\})$, step 512. The neural network weights (FIG. 1 $W_{31}$ to $W_{41}$, etc.) or parameters being adjusted during training are parameters $\theta$, for denoising network 30, and parameters $\phi$, for enhancement network 40.

Gaussian noise image 14 is mixed with RGB image 10 and IR image 12, step 512, such as by concatenating these images, before input to denoising network 30. This is mixing a noise $\epsilon$ into a ground truth image $y_{gt}$ to obtain a noisy ground truth $$y_t = \sqrt{\bar{\alpha}_t}\, y_{gt} + \sqrt{1 - \bar{\alpha}_t}\, \epsilon.$$

Then denoising network 30 operates to denoise the noisy $y_t$, taking a gradient descent on a denoising loss $\nabla_\theta \|\epsilon - \epsilon_\theta(y_t, x_{rgb}, x_{ir}, t)\|_1$, step 514.

After denoising network 30 operates on the input images, its intermediate output is obtained, step 516, as denoised image $$y_\theta = \sqrt{\frac{1}{\bar{\alpha}_t}}\, y_t - \sqrt{\frac{1-\bar{\alpha}_t}{\bar{\alpha}_t}}\, \epsilon_\theta$$

Then this intermediate output form denoising network 30 is input to enhancement network 40, which enhances ye using SRGFM, taking a gradient descent on a correction loss $\nabla_\phi \|y_{gt} - \text{SRGFM}_\phi(y_\theta)\|_1$, step 518.

When the loss is too large, step 520, then the process is repeated from step 512. When the loss is below a convergence threshold, step 520, then training is completed. The final values of parameters $\theta$, for denoising network 30, and parameters $\phi$, for enhancement network 40, can be stored, such as in weights memory 100 of FIG. 1.

Figure 12A:
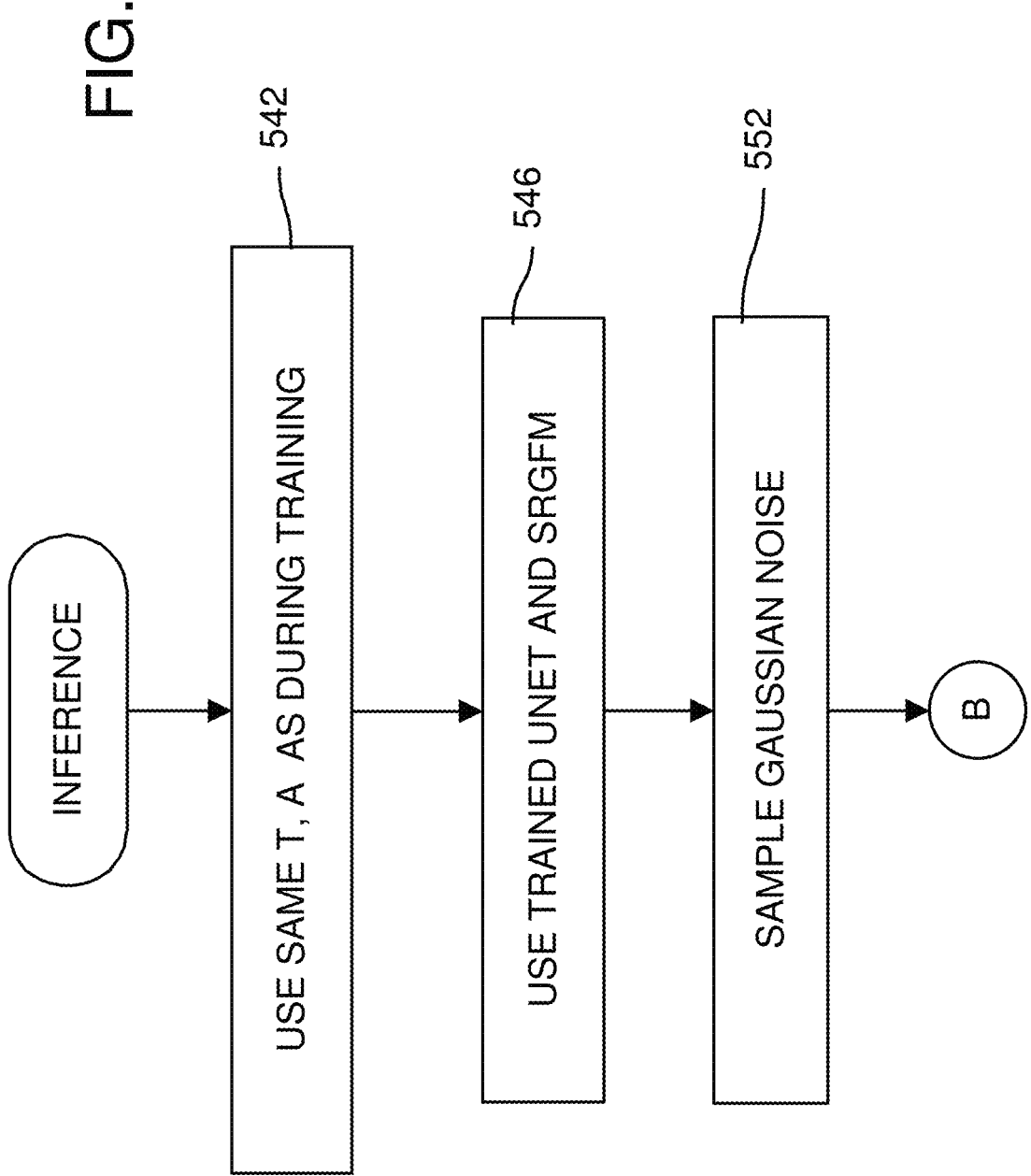
FIGS. 12A-12B show a flowchart of normal operation (inference) of the diffusion network.
Figure 12B:
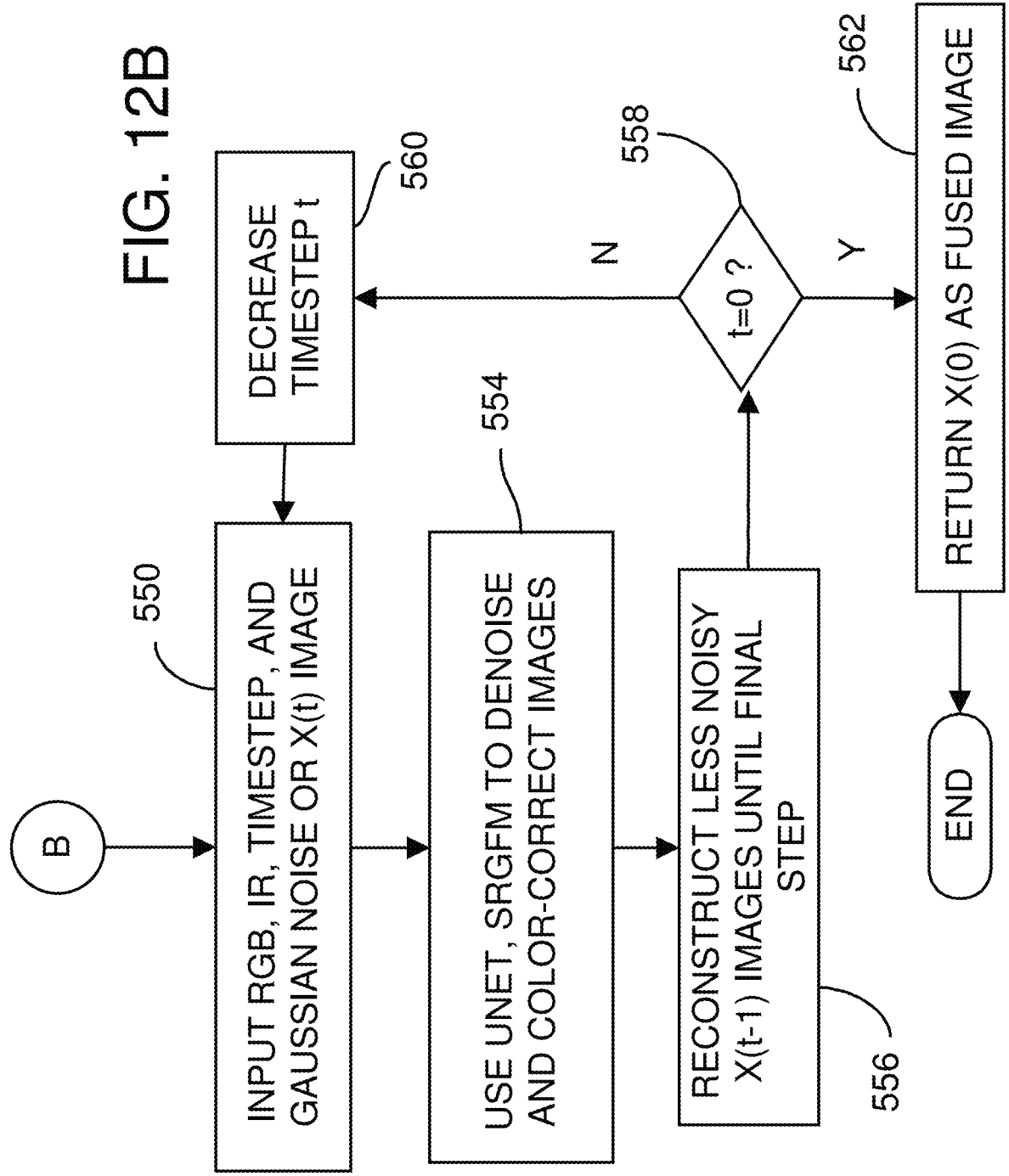

FIGS. 12A-12B show a flowchart of normal operation (inference) of the diffusion network. After training (FIGS. 11A-11B) has been completed, neural network weights have been determined, such as parameters $\theta$, for denoising network 30, and parameters $\phi$, for enhancement network 40. Normal operation or inference can now be performed on new RGB image 10 and IR image 12 that do not have expected results.

The same number of diffusion steps T and $$\{\alpha_t\}_{t=1}^T, \{\bar{\alpha}_t\}_{t=1}^T$$

schedule are used as in the training process, step 542. Denoising network 30 (UNet) and enhancement network 40 (SRGFM) have been trained and are used for processing, step 546. The intermediate output from denoising network 30 is applied as the input image to enhancement network 40. Fusion output 18 that is output from enhancement network 40 is the final output image.

Denoising network 30 samples Gaussian noise image 14, noise $x_T \sim N(0, I)$, step 552. Noise is sampled for the initial iteration only.

In FIG. 12B, step 550, RGB image 10, and IR image 12 ($x_{rgb}$, $x_{ir}$) are input to denoising network 30, which are concatenated with Gaussian noise image 14 for the first iteration when t=T, or concatenated with the feedback image from the prior iteration, which is a less noisy $x_{t-1}$ image, for subsequent iterations t<T. A timestep is also input to denoising network 30 and to enhancement network 40.

Diffusion network 20 and denoising network 30 operate on the inputs to denoise the images to obtain the intermediate output which is enhanced using enhancement network 40 to generate fusion output 18, step 554.

$$x_{\theta\phi} = \text{SRGFM}_\phi\left(\sqrt{\frac{1}{\bar{\alpha}_t}}\, x_t - \sqrt{\frac{1-\bar{\alpha}_t}{\bar{\alpha}_t}}\, \epsilon_\theta(x_t, x_{rgb}, x_{ir})\right)$$

This is repeated, steps 556, 558, 560, for other values of timestep t=T, . . . , 1, using denoising and color correction of denoising network 30 and enhancement network 40.

For each new timestep, step 552, a new value is sampled of Gaussian noise $z \sim N(0, I)$ if t>1, else z=0. This process is repeated, using diffusion network 20 (Unet) and enhancement network 40 (SRGFM) to denoise and color correct the image:

$$x_{\theta\phi} = \text{SRGFM}_\phi\left(\sqrt{\frac{1}{\bar{\alpha}_t}}\, x_t - \sqrt{\frac{1-\bar{\alpha}_t}{\bar{\alpha}_t}}\, \epsilon_\theta(x_t, x_{rgb}, x_{ir})\right)$$

Each iteration reconstructs a less noisy $x_{t-1}$ image, step 556, until the final step:

$$x_{t-1} = \frac{\sqrt{\bar{\alpha}_t}(1-\bar{\alpha}_{t-1})}{1-\bar{\alpha}_t} x_t + \frac{\sqrt{\bar{\alpha}_{t-1}}(1-\alpha_t)}{1-\bar{\alpha}_t} x_{\theta\phi} + \sqrt{\frac{1-\bar{\alpha}_{t-1}}{1-\bar{\alpha}_t}(1-\alpha_t)}\, z$$

Finally in step 562, the final fusion output 18 is returned as $x_0$ as the fused image.

Figure 13B:
FIGS. 13A-13B show detection of smoke-obscured persons in a fused image using the diffusion network with denoising and enhancement of FIGS. 4-12.
Figure 13A:
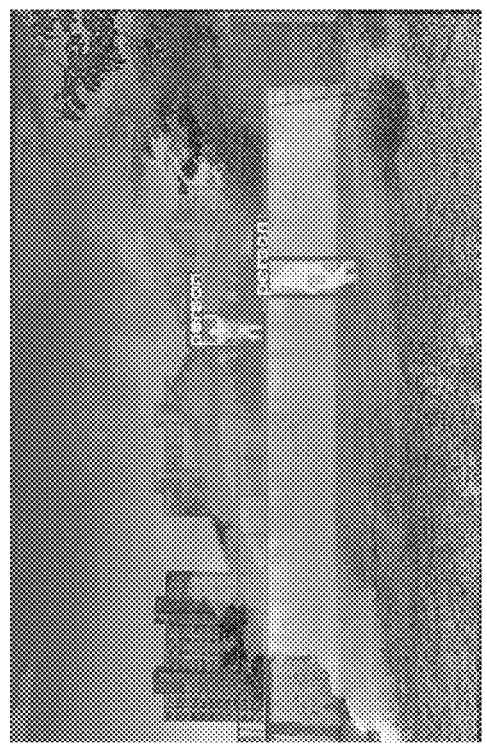

FIGS. 13A-13B shows detection of smoke-obscured persons in a fused image using the diffusion network with denoising and enhancement of FIGS. 4-12. FIG. 13A shows the IR image that is an input to diffusion network 20. The smoke obscures the 2 persons in RGB image 10, but the 2 persons are visible in IR image 12 (FIG. 13A). FIG. 13B shows fusion output 18 that is output from diffusion network 20 (FIG. 4). In the fusion image generated by the diffusion network, 2 persons are clearly visible despite the smoke that obstructs visible light but not IR wavelengths of light. Object tracking can identify and place a box around each person for surveillance software. The fusion image also accurately shows details of the environment such as the grass and trees that are visible in RGB image 10 but are blurred in IR image 12. Thus fusion output 18 combines features from RGB image 10 and IR image 12.

Figure 14:
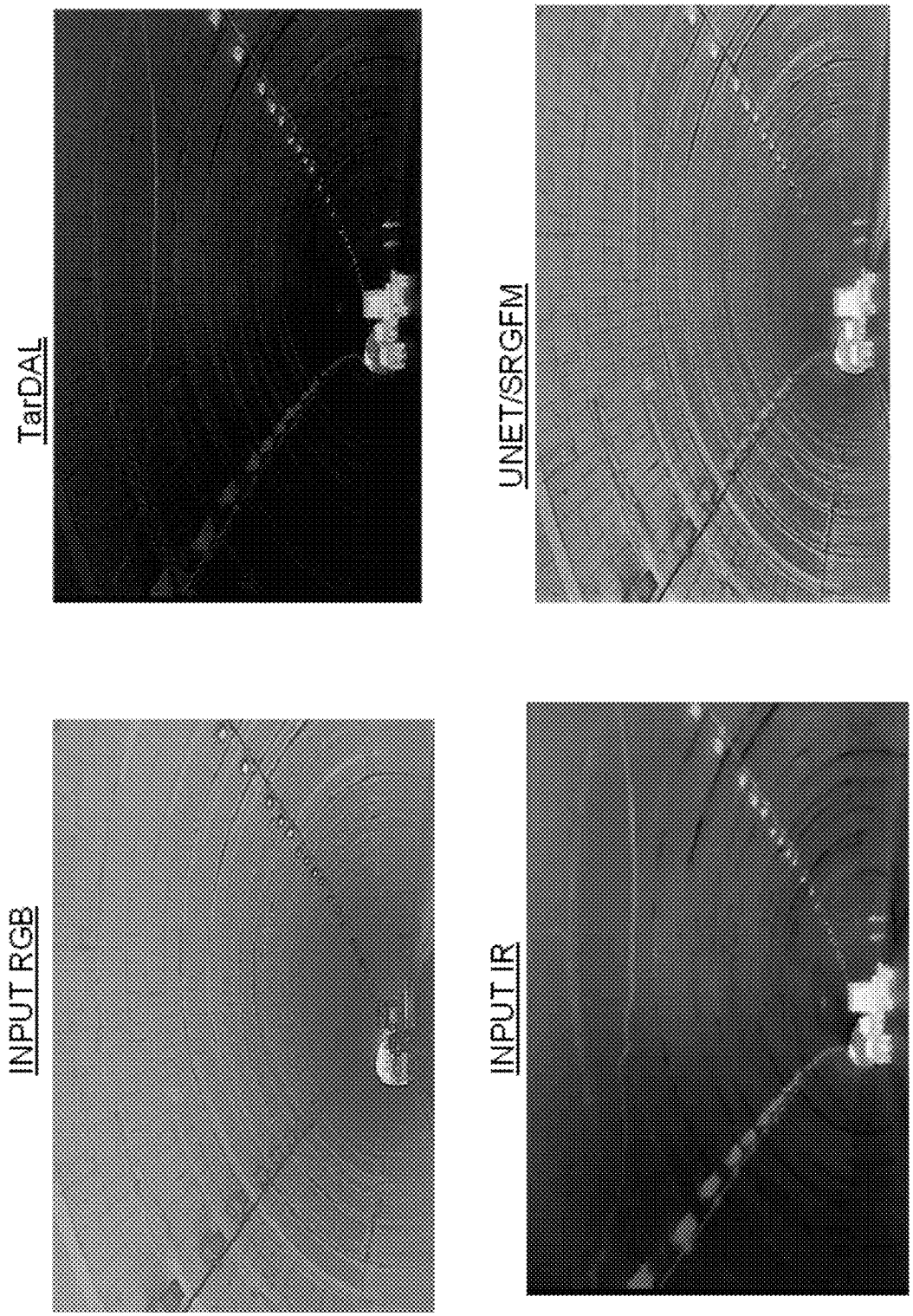
FIG. 14 shows input images with high contrast processed by the prior-art TarDAL and by the invention.

FIG. 14 shows input images with high contrast processed by the prior-art TarDAL and by the invention. The RGB input image shows texture details of the tunnel walls, but the vehicles in the tunnel are too dark. The IR input image lacks texture details but shows the moving vehicles in the tunnel. The prior-art TarDAL method produces a fusion image that shows the vehicles but lacks details from the tunnel walls, which are too dark.

The invention using UNet and SRGFM neural networks produces a fusion image that has the textural details of the tunnel walls from the RGB input image, but also shows the moving vehicles in the tunnel. Thus the invention produces a fusion image with good contrast and detail and better overall subjective quality than the prior-art TarDAL method.

Figure 15:
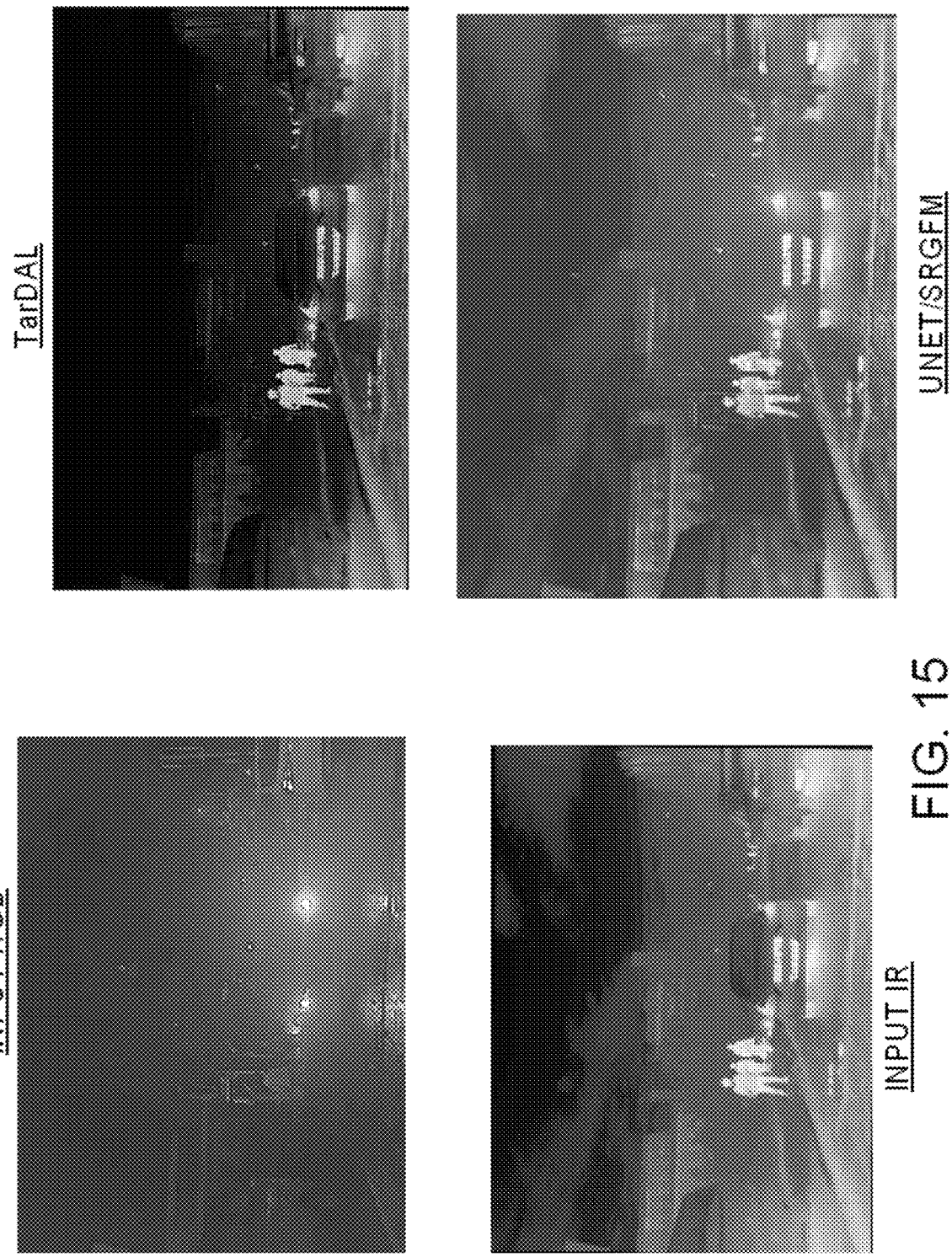
FIG. 15 shows input images with glare processed by the prior-art TarDAL and by the invention.

FIG. 15 shows input images with glare processed by the prior-art TarDAL and by the invention. The RGB input image shows few details due to the glare from the car headlights. The point light sources of the car headlights blasts through the thin fog, which scatters the light producing a dazzle effect. People to the left of the car are dark and barely visible. The IR input image is fuzzier but shows several pedestrians that are brightly lit in IR.

The prior-art TarDAL method produces a fusion image that shows the pedestrians. The invention using UNet and SRGFM neural networks produces a fusion image that also shows these pedestrians, despite the headlight glare. Thus the invention produces a fusion image with good glare reduction and detail and similar overall subjective quality than the prior-art TarDAL method. TarDAL tends to omit color and texture details which are difficult to see in the black-and-white images.

Any image instability, as can occur using TarDAL, could be dangerous. The pedestrians are almost invisible in the RGB image. If the image fusion method is not stable, the pedestrians might be dropped from the fusion image.

FIG. 16 shows training a neural network such as the neural networks of FIGS. 5-12. Raw data such as RGB image 10, IR image 12, and Gaussian noise image 14 are used as video training data 34, V_RAW. The desired fusion image video data that corresponds to the V_RAW values are recorded as target data 38, RGBIR_EN. Each value of RGBIR_EN corresponds to a value of V_RAW that were captured together, such as at the same time index. The target images RGBIR_EN could also be generated from V_RAW or from another image captured by a better camera using a more accurate image processing routine that is too computationally complex and expensive for portable applications.

Neural network 36 receives training data 34 and a current set of weights $A_{ij}$, $B_{ij}$, $W_{ij}$, and operates on training data 34 to generate a result. This generated result is the modeled value of the fusion output 18, RGBIR_CALC. The generated result from neural network 36, RGBIR_CALC, is compared to target data 38, RGBIR_EN, by loss function 42, which generates a loss value that is a function of how far the generated result is from the target. The loss value generated by loss function 42 is used to adjust the weights applied to neural network 36. Many iterations of weights may be applied by loss function 42 onto training data 34 until a minimum loss value is identified, and the final set of weights used to model the calibration curve.

Rather than generate a single value of RGBIR_CALC, neural network 36 may have multiple output nodes 60 to generate many RGBIR_CALC values in parallel from the parallel inputs of V_RAW. Loss function 42 may compare in parallel the many values of RGBIR_CALC to many values of RGBIR_EN to generate a loss function value. For example, blocks of pixels may be compared for adjacent video frames. Alternately, a smaller region of the image frame, such as the area around a license plate, could be evaluated based on the ability of an Optical Character Recognition (OCR) module to accurately extract the license plate's numbers and letters. Loss function 42 could take an input from the OCR module (not shown) when generating the loss function value.

Alternate Embodiments

Several other embodiments are contemplated by the inventors. For example many combinations and variations of the training and inference routines are possible. Some steps may be reordered or performed in parallel or in series. There may be additional or fewer layers, such as layers with convolution. Convolution layers such as 5×5 convolution layer 350 may have different kernels, such as 3×3, 2×2, 4×4, 8×8, 16×16, or non-square kernels such as 2×3, 5×9, etc.

The feature depth parameter n (FIGS. 6A-6B) can be set to 32, 24, 16, or some other value, depending on the computational complexity.

While training both denoising network 30 and enhancement network 40 at the same time has been described, with expected results being the output of enhancement network 40, denoising network 30 and enhancement network 40 could be trained separately, each with its own expected output and inputs.

The kernel size in third convolution block 280 and fourth convolution block 282 in FIG. 7 and FIG. 8 can be 3, but at the cost of computation complexity. In the U-net, contracting layers 52, 54, 56, 58 can be considered to down-sample pixels since the frame size H, W is reduced to H/2, W/2 for each layer while the feature-map depth increases. Expansion layers 72, 74, 76, 78 can be considered to up-sample pixels since the frame size H, W is increased to H*2, W*2 for each layer as the feature-map depth decreases as feature information is consumed. While a scaling factor of 2 is described for each layer, other scaling factors could be substituted. The value of n can be 8, 16, 24, etc., when n increases; typically the accuracy will increase but at the cost of computation complexity.

The diffusion model framework of diffusion neural network is robust and has a high quality. It operates in the pixel space rather than a latent space, and does not suffer from mode collapse as the prior-art GAN suffers from. Diffusion neural network 20 faithfully reconstructs close to the ground truth distribution with DMs pixel-level Gaussian distribution, having a much higher visual fidelity than auto-encoder and GAN based methods. Diffusion neural network 20 is flexible for small-dataset domain transfer, such as DM pre-trained on 70,000 images of RGB low-light face image dataset (RGB domain). It easily transfers to 3,900 images for an RGB+IR image fusion dataset with fine-tuning (multiple-modality domain). Diffusion neural network 20 is scalable with the neural-net size. An increase in the neural-net parameters (capacity) improves the image generation quality. The performance is scalable with the model size. Smaller models have only 6 million parameters. Diffusion neural network 20 is also scalable with inference procedure. Increasing the number of diffusion steps improves the quality. Different inference samplers can be used for speed/quality balance. A faster sampler may complete diffusion in just 5 steps.

A complex operation with convolution and normalization has been described, but other operation types could be substituted or merged. Many modifications to the operations are possible, such as the activation function being a rectifier, a Rectified Linear Unit (ReLU), a global ReLU, leaky ReLU, Parametric Rectified Linear Unit (PreLU), Exponential Linear Unit (ELU), Scaled Exponential Linear Unit (SELU), Concatenated Rectified Linear Unit (CRelu), Randomized Rectified Linear Unit (Rrelu), etc. Convolutions are widely used in neural networks, especially for image processing, where a filter many be applied many times over the image data to generate activations that form a feature map. These features can be selected for further or more specialized processing. ReLU operations are also widely used and useful to eliminate negative value or negative slope effects that can confuse the data analysis.

Some embodiments may not use all components. For example, denoising network 30 may be used without enhancement network 40. Enhancement network 40 may omit up-sampler 360 and thus not support Super Resolution. Some blocks may be reordered, such as multiplier 214 and adder 216 could be reversed so that the bias is added before scaling.

Additional components may be added. Loss function 42 may use various error/loss and cost generators, such as a weight decay term that prevents weights from growing too large over many cycles of training optimization, a sparsity penalty that encourages nodes to zero their weights, so that only a small fraction of total nodes is used. Many substitutions, combinations, and variations are possible. Other variations and kinds of loss or cost terms can be added to loss function 42. The values of the relative scaling factors for the different cost functions can be adjusted to balance the impact of the various functions. The training endpoint for the neural networks may be set for various combinations of conditions, such as a desired final accuracy, an accuracy-hardware cost product, a target hardware cost, etc.

Neural network 36, loss function 42, and other components may be implemented in a variety of technologies, using various combinations of software, hardware, firmware, routines, modules, functions, etc. The final result may be derived from neural network 36 with the final weights, and might be implemented as a program module, or in an Application-Specific Integrated Circuit (ASIC) or other hardware to increase processing speed and lower power consumption.

Terms such as left, right, up, down, are relative and can be flipped, rotated, transformed, or transposed in various ways. Adders may add complement values to implement subtraction. Subtraction and addition thus can be used interchangeably.

The data operated upon at different ones of the contracting layers and expansion layers may be referred to as pixels, although after down-sampling by ABR down-sampling block 440 in the contracting layers, each pixel may be a combination of data from many input pixels from the input frame. Thus the intermediate data may not be a true pixel for display, but a derivative or transformation of the original display pixels. However the term pixel may still be used herein for these intermediate data items. While RGB images have been described, other color pixel maps could be substituted, such as YUV.

ABR down-sampling block 440 may be considered to be the first part of each contracting layer rather than the last part of each of contracting layer. Various other re-arrangements may occur. Many variations of ABR block 450, 456, 458, ABR down-sampling block 440, ABR up-sampling block 470, spatial attention blocks 460, 466, 468, adaptive group normalization block 230, feature modulation block 390, and others are also possible.

Some components such as a white balancer could be added or removed. Other modules can be added such as for edge enhancement and color enhancement. Edge enhancement can be performed on the luminance while color enhancement could be performed on the chrominance components only, for example. Other kinds of image sensors that operate at different, non-IR wavelengths, could be substituted to generate IR image 12, which could have a wavelength of light that is not Infrared.

Additional buffering and pipeline registers can be added at several points in the data path. Parallel data paths could be used to increase throughput. Larger buffers for larger pixel formats could be used, such as a Bayer-pattern buffer or a luminance buffer, or even full-frame buffers. Pixels in buffers may be physically stored in various arrangements. Various interleaving and mapping schemes could alter the actual storage locations to optimize bandwidth or other design parameters. Many memory arrangements, both physical and logical, are possible.

Various parallel processing techniques may be used that perform the basic operations described here in a serial fashion for easier understanding. Appropriate input and coefficient changes can be made by a person of skill in the art. Partial or other calculations may be performed.

Different data encodings and primary colors can be used. Bit widths can be varied. Many data formats may be used with the invention. Additional functions can be added. Many arrangements of adders, shifters, and logic units are possible. Adders may be reused or used recursively. Some image sensors may alter the image in different ways. Various modifications can be made as needed to accommodate these changes.

Terms such as up, down, above, under, horizontal, vertical, inside, outside, are relative and depend on the viewpoint and are not meant to limit the invention to a particular perspective. Devices may be rotated so that vertical is horizontal and horizontal is vertical, so these terms are viewer dependent.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An image-guided multiple-modality image fusion system comprising:
a computer or a machine comprising circuitry to implement a denoising neural network that receives a color image having pixels representing multiple colors, and that receives a non-visible-light image having mono-color pixels generated by a non-visible-light detector, and that receives a Gaussian noise image, the denoising neural network generating an intermediate image as an output;
wherein the computer or the machine further comprises circuitry to implement an enhancement neural network that receives the intermediate image from the denoising neural network and that generates a fusion output;
wherein the fusion output is fed back to an input of the denoising neural network;
wherein the denoising neural network comprises:
a series of contracting layers, each contracting layer reducing a number of pixels and increasing feature-map depth;
a series of expansion layers, after the series of contracting layers, each expansion layer increasing a number of pixels and decreasing feature-map depth;
each contracting layer in the series of contracting layers comprising an Adaptive Bottleneck Residual (ABR) block and an ABR down-sampling block that is an instance of the ABR block with a down-sampler;
each expansion layer in the series of expansion layers comprising the ABR block and an ABR up-sampling block that is an instance of the ABR block with an up-sampler;
a first layer that receives the color image, the non-visible-light image, and the Gaussian noise image, and that receives the fusion output during non-initial iterations, the first layer driving an input to an initial contracting layer in the series of contracting layers; and
a last layer that outputs the intermediate image from a final expansion layer in the series of expansion layers; and a timestep embedder, in the ABR block, wherein a timestep is injected into each ABR block and into each ABR down-sampling block and into each ABR up-sampling block;
wherein features from the non-visible-light image and from the color image are fused together to form the fusion output.

2. The image-guided multiple-modality image fusion system of claim 1 wherein the enhancement neural network comprises:
multiple convolution layers that convolute the intermediate image to generate a condition vector that identifies global features in the intermediate image;
a first layer that convolutes the intermediate image to generate a first layer output;
a second layer that convolutes the first layer output to generate a second layer output;
a third layer that convolutes the second layer output to generate a third layer output that is the fusion output.

3. The image-guided multiple-modality image fusion system of claim 2 wherein the first layer, the second layer, and the third layer each comprise:
a convolution layer;
an adaptive group normalization block that normalizes an output from the convolution layer and that embeds a timestep to generate a feature map;
a feature modulation block that receives the condition vector and modulates global features identified by the condition vector that are present in the feature map to generate a layer output;
wherein the feature modulation block performs Global Feature Modulation (GFM) in response to the global features identified by the condition vector.

4. The image-guided multiple-modality image fusion system of claim 3 wherein the enhancement neural network further comprises:
an up-sampler that up-samples the intermediate image before input to the first layer,
wherein the enhancement neural network performs Super Resolution image enhancement with Global Feature Modulation (SRGFM).

5. The image-guided multiple-modality image fusion system of claim 4 wherein the first layer and the second layer further comprise:
an activation block that performs an activation function on the feature map to generate the layer output,
wherein the first layer output and the second layer output are activated before input to a next convolution layer.

6. The image-guided multiple-modality image fusion system of claim 4 wherein the feature modulation block comprises:
a linear block that linearizes the condition vector;
a chunking block that forms groups from the condition vector;
a scaler that generates a scale factor from the groups from the condition vector;
a bias generator that generates a bias from the groups from the condition vector;
a multiplier that multiplies an input feature map by the scale factor to generate a scaled feature map; and
an adder that adds the bias to the scaled feature map to generate an output feature map for the layer output.

7. The image-guided multiple-modality image fusion system of claim 3 wherein the series of contracting layers and the series of expansion layers form a U-net convolution neural network;

wherein the denoising neural network is a U-net Convolution Neural Network (CNN).

8. The image-guided multiple-modality image fusion system of claim 7 wherein an output from an ABR block in the series of contracting layers is concatenated with an output from an ABR block in the series of expanding layers for each layer.

9. The image-guided multiple-modality image fusion system of claim 7 wherein the ABR block comprises:
a first layer receiving an input to the ABR block and having a convolution layer generating a first layer output to a next layer;
wherein the convolution layer in the first layer comprises a 1×1 bottleneck convolution layer;
one or more intermediate layers, each receiving a layer output from a prior layer and each having a convolution layer generating a layer output;
a last layer receiving the layer output for a last layer of the one or more intermediate layers and having a convolution layer generating a last layer output;
a bottleneck convolution layer receiving the input to the ABR block and generating a bottleneck convolution output;
an ABR adder that adds the bottleneck convolution output to the last layer output to generate an output of the ABR block;
a normalizer in each layer for normalizing an input to the layer.

10. The image-guided multiple-modality image fusion system of claim 9 wherein one or more normalizers in the last layer and in the one or more intermediate layers comprises an adaptive group normalization block;
wherein the adaptive group normalization block further comprises:
a linear block that linearizes the timestep;
a chunking block that forms groups from the timestep;
a scaler that generates a scale factor from the groups from the timestep;
a bias generator that generates a bias from the groups from the timestep;
a group normalizer that normalizes an input to the adaptive group normalization block to generate a normalized dataset;
a multiplier that multiplies the normalized dataset by the scale factor to generate a scaled normalized dataset;
an adder that adds the bias to the scaled normalized dataset to generate an output of the adaptive group normalization block.

11. The image-guided multiple-modality image fusion system of claim 10 wherein each layer further comprises:
an activation block that performs an activation function on an output from the normalizer to generate an input to the convolution layer,
wherein normalized outputs are activated before input to the convolution layer.

12. The image-guided multiple-modality image fusion system of claim 3 wherein the first layer concatenates the color image, the non-visible-light image, and the Gaussian noise image to drive the input to the initial contracting layer in the series of contracting layers for an initial iteration.

13. The image-guided multiple-modality image fusion system of claim 3 wherein the color image has pixels representing Red, Green, and Blue colors;
wherein non-visible-light is Infra-Red (IR) light, wherein the non-visible-light image is an IR image having mono-color pixels generated by an IR camera.

14. A method for multiple-modality image fusion comprising:
receiving for each scene a RGB image and receiving an IR image having details that are not visible in the RGB image;
combining the RGB image, the IR image, and a noise image to generate a combined input;
iterating a denoising neural network that receives the combined input and generates an intermediate image having reduced noise as a number of iterations increases, the denoising neural network using the RGB image and the IR image as guidance images for each iteration to reduce noise in subsequent iterations;
wherein the denoising neural network is a UNet Convolution Neural Network (CNN) formed from Adaptive Bottleneck Residual (ABR) blocks at each level, each ABR block having a convolution layer generating a convolution output that is normalized to generate a normalized output, each ABR block receiving a timestep that is embedded by scaling and biasing the normalized output in response to the timestep;
iterating an enhancement neural network that receives the intermediate image as an input and generates a fusion output;
feeding back the fusion output for input to the denoising neural network for non-final iterations, and outputting the fusion output as a fusion image output that is an RGB output image having features from both the RGB image and the IR image;
using a series of convolution layers, in the enhancement neural network, to convolute the intermediate image to generate a condition vector that identifies global features;
using a plurality of layers in the enhancement neural network, each layer in the plurality of layers having a convolution layer, an adaptive group normalization block, a feature modulation block, and an activation block that generates an output to a next layer in the plurality of layers, and using a final layer in the plurality of layers to generate the fusion output, and a first layer in the plurality of layers receiving the intermediate image; and
embedding a timestep by scaling the timestep to generate a scaled timestep that is multiplied with an output of the convolution layer in the enhancement neural network that is normalized in the adaptive group normalization block;
the feature modulation block receiving the condition vector and scaling the condition vector to modulate global features processed by the feature modulation block;
whereby the RGB image is fused with the IR image by denoising and global feature modulation.

15. The method of claim 14 further comprising using the ABR block which comprises:
receiving an input to the ABR block at a first layer and having a convolution layer generating a first layer output to a next layer;
wherein the convolution layer in the first layer comprises a 1×1 bottleneck convolution layer;
using one or more intermediate layers, each receiving a layer output from a prior layer and each having a convolution layer generating a layer output;
receiving at a last layer the layer output for a last layer of the one or more intermediate layers and using a convolution layer to generate a last layer output;

receiving the input to the ABR block at a bottleneck convolution layer and generating a bottleneck convolution output;
using an ABR adder to add the bottleneck convolution output to the last layer output to generate an output of the ABR block;
using a normalizer in each layer to normalize an input to the layer.

16. The method of claim 15 wherein one or more normalizers in the ABR block comprises an adaptive group normalization block that further comprises:
linearizing the timestep;
forming groups from the timestep;
generating a scale factor from the groups from the timestep;
generating a bias from the groups from the timestep;
normalizing an input to the adaptive group normalization block to generate a normalized dataset;
multiplying the normalized dataset by the scale factor to generate a scaled normalized dataset;
adding the bias to the scaled normalized dataset to generate an output of the adaptive group normalization block.

17. The method of claim 16 wherein using the denoising neural network further comprises:
using spatial attention blocks that precede ABR blocks having an up-sampler or a down-sampler in lower levels of the UNet CNN.

18. The method of claim 17 wherein using the enhancement neural network further comprises:
up-sampling the intermediate image for input to the first layer in the enhancement neural network;
using the feature modulation block to modulate global features identified by the condition vector;
whereby the enhancement neural network performs Super-Resolution Global Feature Modulation (SFGFM).

19. A multiple-modality image fusion system comprising:
a computer or a machine further comprising circuitry to implement a denoising neural network that receives a color image having pixels representing multiple colors, and that receives a non-visible-light image having mono-color pixels generated by a non-visible-light detector, and that receives a Gaussian noise image for an initial iteration, and that receives a feedback image for non-initial iterations;
wherein the denoising neural network generates an intermediate image as an output; and
the computer or the machine further comprising circuitry to implement an enhancement neural network that receives the intermediate image from the denoising neural network and that generates the feedback image;
wherein the denoising neural network further comprises:
a convolution neural network having contracting layers and expansion layers that form a U-net, the convolution neural network further comprising:
an input layer that receives the color image, the non-visible-light image, and receives the Gaussian noise image for the initial iteration and receives the feedback image for the non-initial iterations, the input layer outputting a dataset with spatial pixel-derived data and feature-depth data;
a series of contracting layers after the input layer, each contracting layer having an Adaptive Bottleneck Residual (ABR) block;
a series of expansion layers, each expansion layer having a concatenation layer that concatenates an output from a preceding expansion layer with an output from a contracting layer, and an ABR block in each expansion layer;
a bottom layer having ABR blocks and spatial attention blocks, the bottom layer receiving a dataset from a lowest-level contracting layer, and outputting a dataset to a lowest-level expansion layer;
an output layer that receives an output from a last of the series of expansion layers, and outputs the intermediate image;
wherein the ABR block layer comprises:
an input tensor;
an output tensor;
a bypass bottleneck convolution block receiving the input tensor and outputting a bypass dataset;
an adder that adds a primary dataset to the bypass dataset to generate the output tensor;
a first normalizer that normalizes the input tensor;
a first activation block that executes an activation function on an output of the first normalizer to generate a first convolution input;
a first bottleneck convolution block that convolutes the first convolution input to generate a first convolution output;
a second adaptive normalizer that normalizes the first convolution output;
a second activation block that executes an activation function on an output of the second adaptive normalizer to generate a second convolution input;
a second convolution block that convolutes the second convolution input to generate a second convolution output;
a third adaptive normalizer that normalizes the first convolution output;
a third activation block that executes an activation function on an output of the third adaptive normalizer to generate a third convolution input;
a third convolution block that convolutes the third convolution input to generate a third convolution output;
a fourth adaptive normalizer that normalizes the first convolution output;
a fourth activation block that executes an activation function on an output of the fourth adaptive normalizer to generate a fourth convolution input;
a fourth bottleneck convolution block that convolutes the fourth convolution input to generate the primary dataset;
a timestep embedder that outputs a timestep to the second adaptive normalizer, the third adaptive normalizer, and the fourth adaptive normalizer that embed the timestep into the second convolution input, the third convolution input, and the fourth convolution input;
wherein the enhancement neural network further comprises:
a series of convolution blocks that receives the intermediate image and outputs a condition vector;
a first enhancement convolution block that convolutes the intermediate image to generate a first convolution result;
a first enhancement normalizer that normalizes the first convolution result and embeds the timestep to generate a first normalized result;

a first feature modulation block that modulates global features in the first normalized result to generate a first modulated result, wherein the global features are modulated in response to the condition vector;

a first enhancement activation block that executes an activation function on the first modulated result to generate a second enhancement convolution input;

a second enhancement convolution block that convolutes the second enhancement convolution input to generate a second convolution result;

a second enhancement normalizer that normalizes the second convolution result and embeds the timestep to generate a second normalized result;

a second feature modulation block that modulates global features in the second normalized result to generate a second modulated result, wherein the global features are modulated in response to the condition vector;

a second enhancement activation block that executes an activation function on the second modulated result to generate a third enhancement convolution input;

a third enhancement convolution block that convolutes the third enhancement convolution input to generate a third convolution result;

a third enhancement normalizer that normalizes the third convolution result and embeds the timestep to generate a third normalized result; and a third feature modulation block that modulates global features in the third normalized result to generate the feedback image, wherein the global features are modulated in response to the condition vector.

20. The multiple-modality image fusion system of claim 19 further comprising:

an up-sampler that up-samples the intermediate image before input to the first enhancement convolution block, wherein the enhancement neural network performs super-resolution global feature modulation.

* * * * *